(12) United States Patent
Neblett et al.

(10) Patent No.: US 12,711,716 B2
(45) Date of Patent: Aug. 18, 2026

(54) AUGMENTED REALITY SYSTEM AND METHOD

(71) Applicant: The Boeing Company, Arlington, VA (US)

(72) Inventors: Samuel Helm Neblett, Madison, AL (US); David Wesley Ross, Long Beach, CA (US); Alexus Hunter, Summerville, SC (US); Richard T. Moore, Riverside, CA (US); Brian Dale Laughlin, Wichita, KS (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/680,899

(22) Filed: May 31, 2024

(65) Prior Publication Data

US 2024/0404218 A1 Dec. 5, 2024

Related U.S. Application Data

(60) Provisional application No. 63/505,881, filed on Jun. 2, 2023.

(51) Int. Cl.
*G06T 19/00* (2011.01)
*G06F 3/01* (2006.01)

(52) U.S. Cl.
CPC ............ *G06T 19/006* (2013.01); *G06F 3/011* (2013.01)

(58) Field of Classification Search
CPC ........ G06T 19/006; G06F 3/011; G06F 3/013; G06F 3/017
See application file for complete search history.

(56) References Cited

U.S. PATENT DOCUMENTS

| | | | | |
|---|---|---|---|---|
| 9,870,716 B1 * | 1/2018 | Rao | H04N 21/2353 | |
| 11,907,421 B1 * | 2/2024 | Clements | G06F 3/012 | |
| 2011/0242039 A1 * | 10/2011 | Kalis | G06F 1/1643 | 715/702 |
| 2014/0279082 A1 * | 9/2014 | Hurst | G06Q 50/12 | 705/15 |
| 2018/0093186 A1 * | 4/2018 | Black | G06T 11/60 | |
| 2018/0324229 A1 * | 11/2018 | Ross | G06F 3/1423 | |
| 2020/0125846 A1 * | 4/2020 | Laughlin | B29C 70/30 | |

* cited by examiner

*Primary Examiner* — Antonio Xavier
(74) *Attorney, Agent, or Firm* — Harrity & Harrity, LLP

(57) ABSTRACT

An augmented reality (AR) system for use by a user in a surrounding environment includes a head-mounted display (HMD), a handheld computing device (HCD) and a control module operatively connected with one or both of the HMD and the HCD. The system is configured to enable digital content to be displayed simultaneously on the HMD and on the HCD, and/or to use one of the HMD and the HCD to modify digital content or to execute an action on the other of the HMD and the HCD, with the HCD being positionable by the user outside of the HMD's lens field of view, thereby providing an enhanced or extended user field of view.

20 Claims, 15 Drawing Sheets

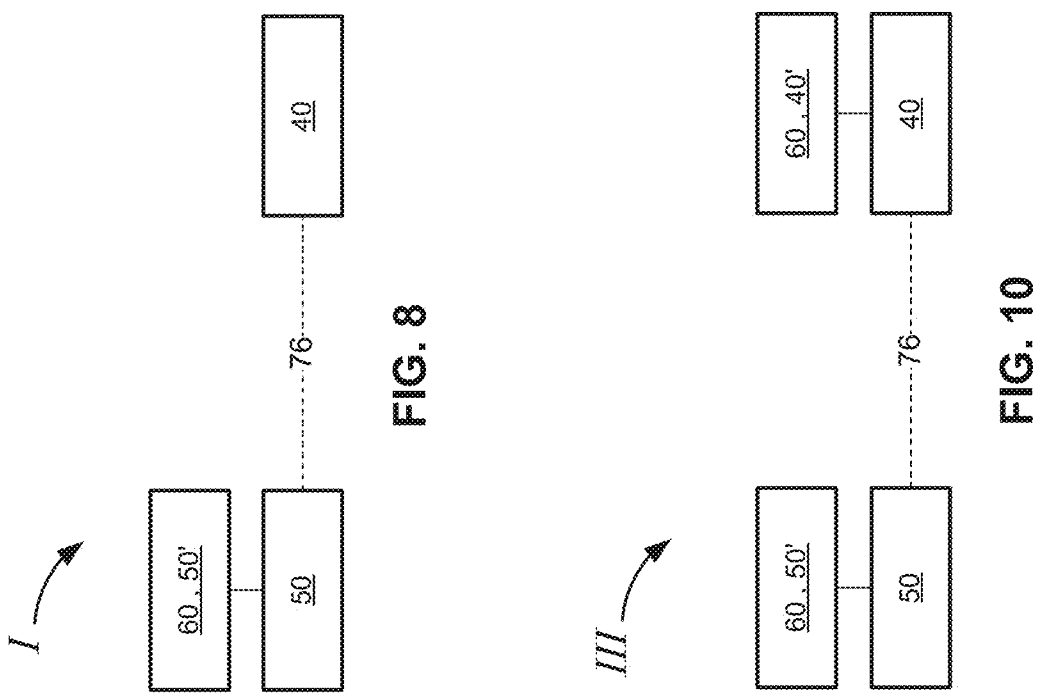
40
76
FIG. 8
60 , 50'
50
I
60 , 40'
40
76
FIG. 10
60 , 50'
50
III
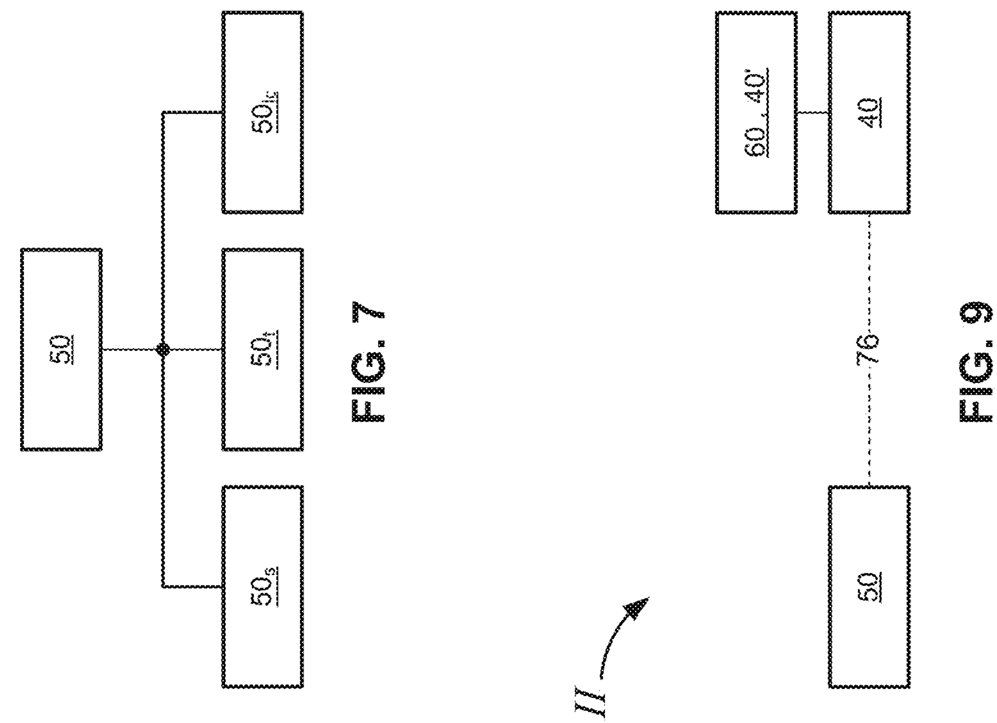
50
FIG. 7
60 , 40'
40
76
FIG. 9
50
II

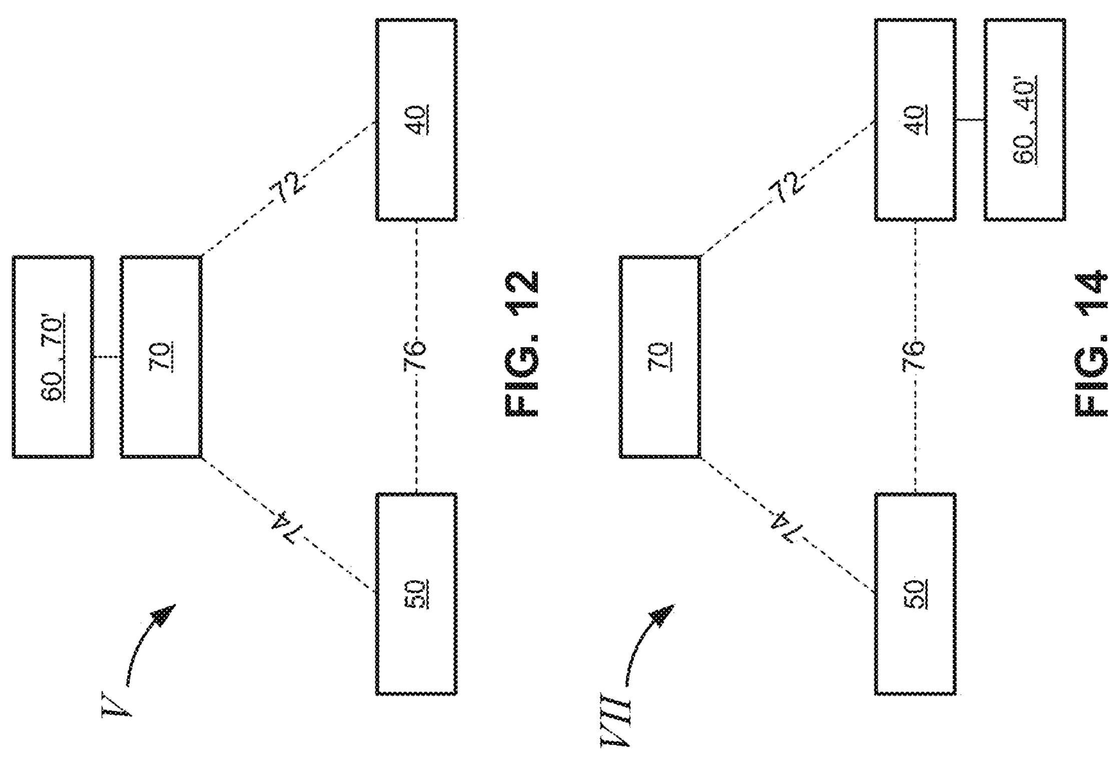
FIG. 12
FIG. 14
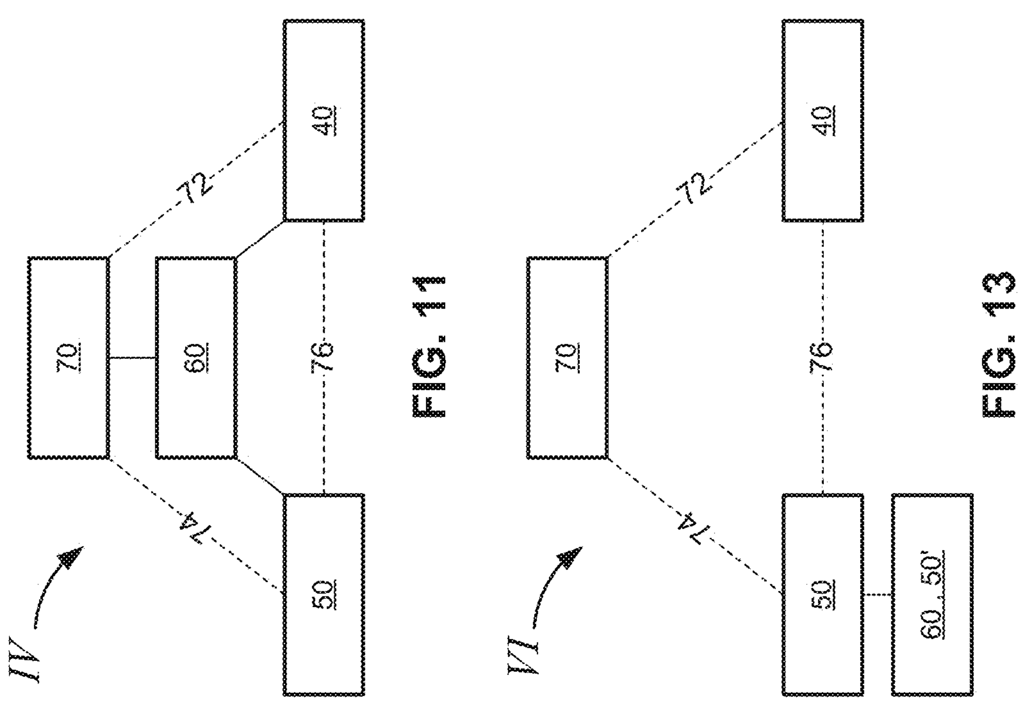
FIG. 11
FIG. 13

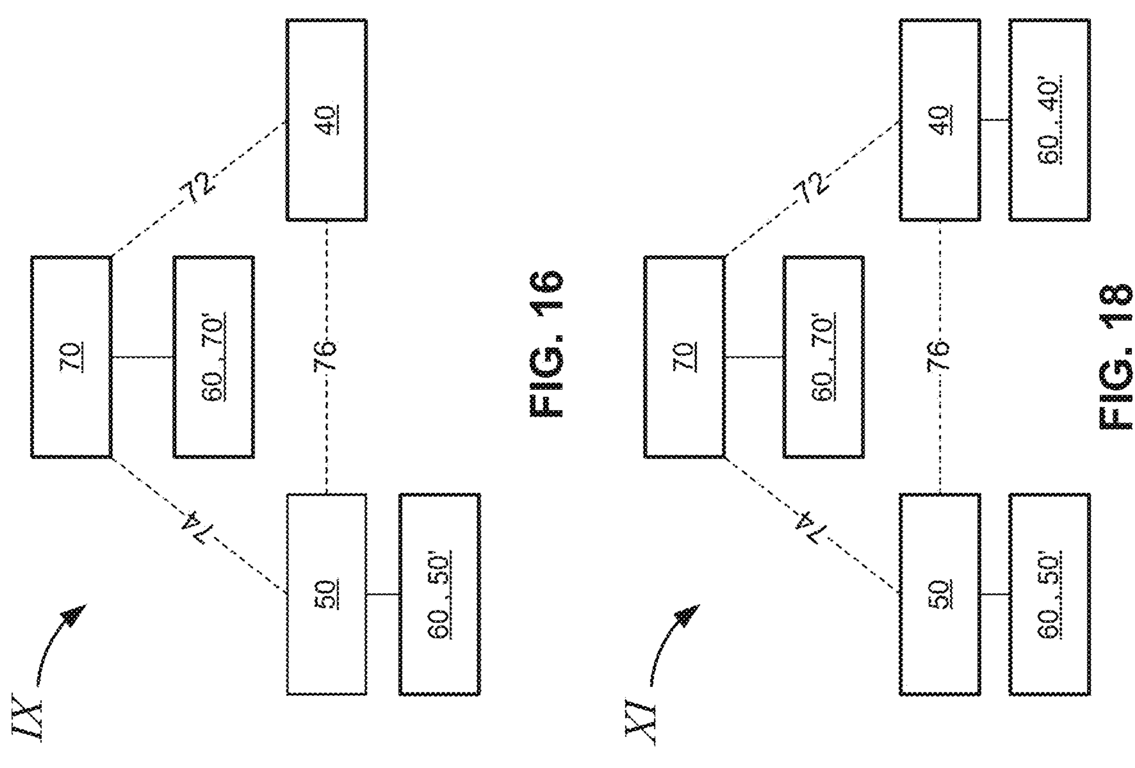
FIG. 16
FIG. 18
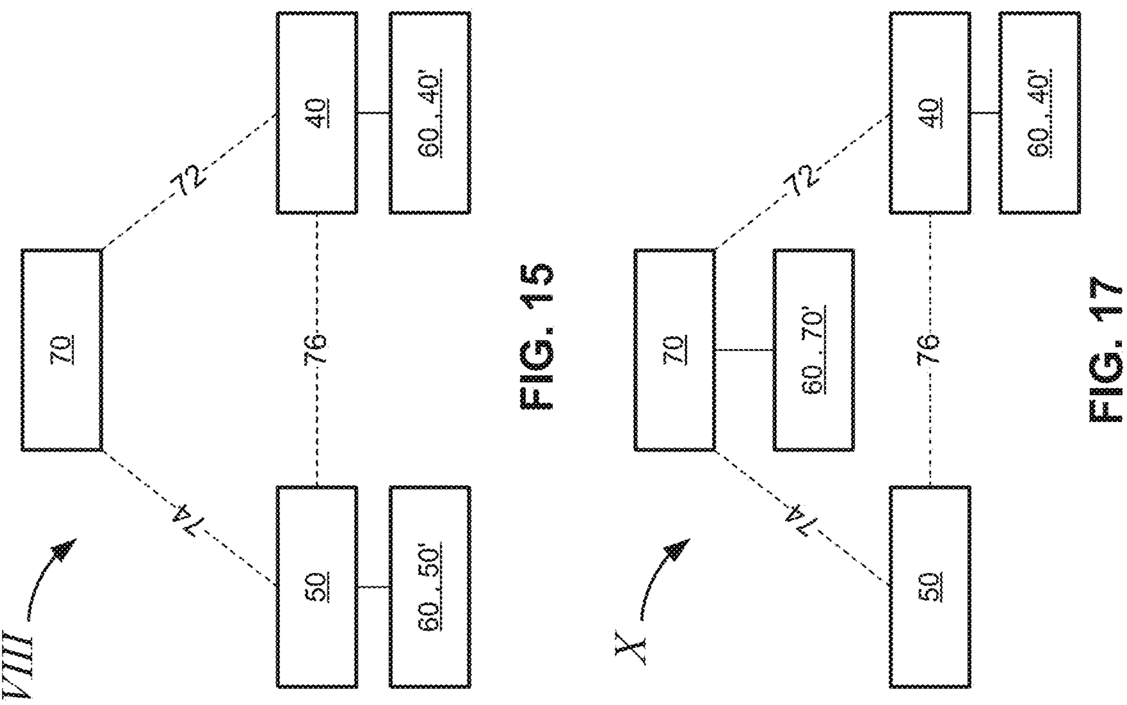
FIG. 15
FIG. 17

FIG. 23

AUGMENTED REALITY SYSTEM AND METHOD

PRIORITY CLAIM AND CROSS-REFERENCE TO RELATED APPLICATIONS

This application claims priority to, and the benefit of, U.S. Provisional Patent Application No. 63/505,881 filed Jun. 2, 2023, which is incorporated herein by reference in its entirety.

INTRODUCTION

This disclosure relates generally to augmented reality systems for use by a user in a surrounding environment and to methods of operating such augmented reality systems. Augmented reality (AR) and virtual reality (VR) are currently enjoying ever-increasing use in multiple fields, such as education, gaming, manufacturing and product design. In VR, a user may wear a headset or head-mounted display (HMD) which covers the user's eyes and provides a screen onto which an alternate reality is displayed in real-time. In AR, the headset or HMD includes a transparent lens, with a portion of the lens configured such that one or more virtual images may be projected onto this portion of the lens.

However, in both VR and AR applications, the amount of screen or lens area onto which virtual images may be projected is limited.

SUMMARY

According to one embodiment, an AR system for use by a user in a surrounding environment includes: a head-mounted display (HMD) having a lens that is generally transparent and/or permits video pass-through functionality and through which the surrounding environment is visible to the user, a predetermined portion of the lens for displaying digital content thereon and/or therethrough for viewing by the user, and a first group of sensors configured for sensing a user action and/or a met condition; a handheld computing device (HCD) having an HCD display and a second group of sensors configured for sensing the user action and/or the met condition; and a control module operatively connected with one or both of the HMD and the HCD. The control module is configured to: sense the user action and/or the met condition; and if the user action and/or the met condition is sensed by the first group of sensors, then modify digital content displayed on the HCD display based on the sensed user action and/or the sensed met condition; and if the user action and/or the met condition is sensed by the second group of sensors, then modify digital content displayed on the predetermined portion of the lens based on the sensed user action and/or the sensed met condition.

The HCD may be a smartphone, a tablet or a laptop computer. When wearing the HMD, the user may have a natural field of view, the generally transparent lens may have a lens field of view as viewed by the user that is within and smaller than the natural field of view, and the virtual images may be projectable onto a virtual image field of view as viewed by the user that is within and smaller than the lens field of view, wherein the HCD may be positioned by the user at least partially outside of the virtual image field of view.

The user action may include one or more of a roll of the HMD, a pitch of the HMD, a yaw of the HMD, a translation of the HMD, an eye movement, a hand gesture, a tool gesture, a voice command spoken to the HMD, a push of a button on the HCD, a gesture on a touchscreen/touchpad of the HCD, a shaking of the HCD and a voice command spoken to the HCD. The gesture on the touchscreen/touchpad may include one or more of a tap, a double tap, a short press, a long press, a swipe, a pinch, a magnification, a pan, a drag and a rotation.

The control module may be further configured to permit a first modification of digital content on one of the predetermined portion of the lens and the HCD display, and simultaneously cause a second modification of digital content on the other of the predetermined portion of the lens and the HCD display, wherein the second modification is substantially the same as the first modification.

The control module may be further configured to permit a first modification of digital content on one of the predetermined portion of the lens and the HCD display without modifying digital content simultaneously on the other of the predetermined portion of the lens and the HCD display.

The AR system may be configured to enable the user to add additional digital content to the HCD display with the additional digital content also being displayed simultaneously on the predetermined portion of the lens. Alternatively, the AR system may be configured to enable the user to add additional digital content to the HCD display without the additional digital content being displayed simultaneously on the predetermined portion of the lens. Additionally, the AR system may be configured to enable the user to add additional digital content to the HCD display and to utilize one or more applications on the HCD for processing the additional digital content.

The AR system may further include one or both of a local ad hoc connection between the HMD and the HCD for facilitating communication therebetween, and a server operatively connected with the HMD and the HCD for facilitating communication with and/or between the HMD and the HCD.

The control module may be embedded as a respective portion of one or both of the HMD and the HCD.

The control module may be further configured to cause the digital content to be displayed simultaneously on the predetermined portion of the lens and on the HCD display.

According to another embodiment, a method is provided of modifying digital content within an AR system that includes a head-mounted display (HMD) having a first group of sensors configured for sensing a user action and/or a met condition, a handheld computing device (HCD) having a second group of sensors configured for sensing the user action and/or the met condition, and a control module operatively connected with one or both of the HMD and the HCD. The method includes: sensing the user action and/or the met condition; and if the user action and/or the met condition is sensed by the first group of sensors, then modifying digital content displayed on the HCD based on the sensed user action and/or the sensed met condition; and if the user action and/or the met condition is sensed by the second group of sensors, then modifying digital content displayed on the HMD based on the sensed user action and/or the sensed met condition.

The method may also include receiving a first command from the HMD based on the sensed user action and/or the sensed met condition, and modifying the digital content on the HCD based on the received first command. The method may further include receiving a second command from the HCD based on the sensed user action and/or the sensed met condition, and modifying the digital content on the HMD based on the received second command.

The method may further include displaying additional digital content on the HCD with the additional digital content also being displayed simultaneously on the HMD, or displaying additional digital content on the HCD without the additional digital content also being displayed simultaneously on the HMD.

The method may further include making a first modification of the digital content on one of the HMD and the HCD; and simultaneously making a second modification of the digital content on the other of the HMD and the HCD, wherein the second modification is substantially the same as the first modification.

The method may further include making a first modification of the digital content on one of the HMD and the HCD without modifying the digital content simultaneously on the other of the HMD and the HCD.

The method may further include displaying additional digital content on the HCD, and utilizing one or more applications on the HCD for processing the additional digital content.

The method may further include simultaneously displaying the digital content on the HMD and on the HCD based on the sensed user action and/or the sensed met condition.

According to yet another embodiment, a method of using an AR system by a user in a surrounding environment is provided, wherein the AR system includes a head-mounted display (HMD) having a first group of sensors configured for sensing a user action, a handheld computing device (HCD) having a second group of sensors configured for sensing the user action, and a control module operatively connected with one or both of the HMD and the HCD. The method includes: executing the user action by the user; sensing the user action by one of the HMD, via the first group of sensors, and the HCD, via the second group of sensors; and modifying, by the control module, digital content displayed on the other of the HMD and the HCD based on the sensed user action.

In this method, the user action may include one or more of a roll of the HMD, a pitch of the HMD, a yaw of the HMD, a translation of the HMD, an eye movement, a hand gesture, a tool gesture, a voice command spoken to the HMD, a push of a button on the HCD, a gesture on a touchscreen or a touchpad of the HCD, a shaking of the HCD and a voice command spoken to the HCD.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIG. 7 is a block diagram showing various embodiments of an HCD.

FIGS. 8-10 are block diagrams of various arrangements of an HMD and an HCD according to first through third configurations of an AR system, respectively.

FIGS. 11-18 are block diagrams of various arrangements of an HMD, an HCD and a server according to fourth through eleventh configurations of an AR system, respectively.

FIGS. 20-25 are flowcharts of various methods for operating an AR system in accordance with the present disclosure.

DETAILED DESCRIPTION

Figure 1:
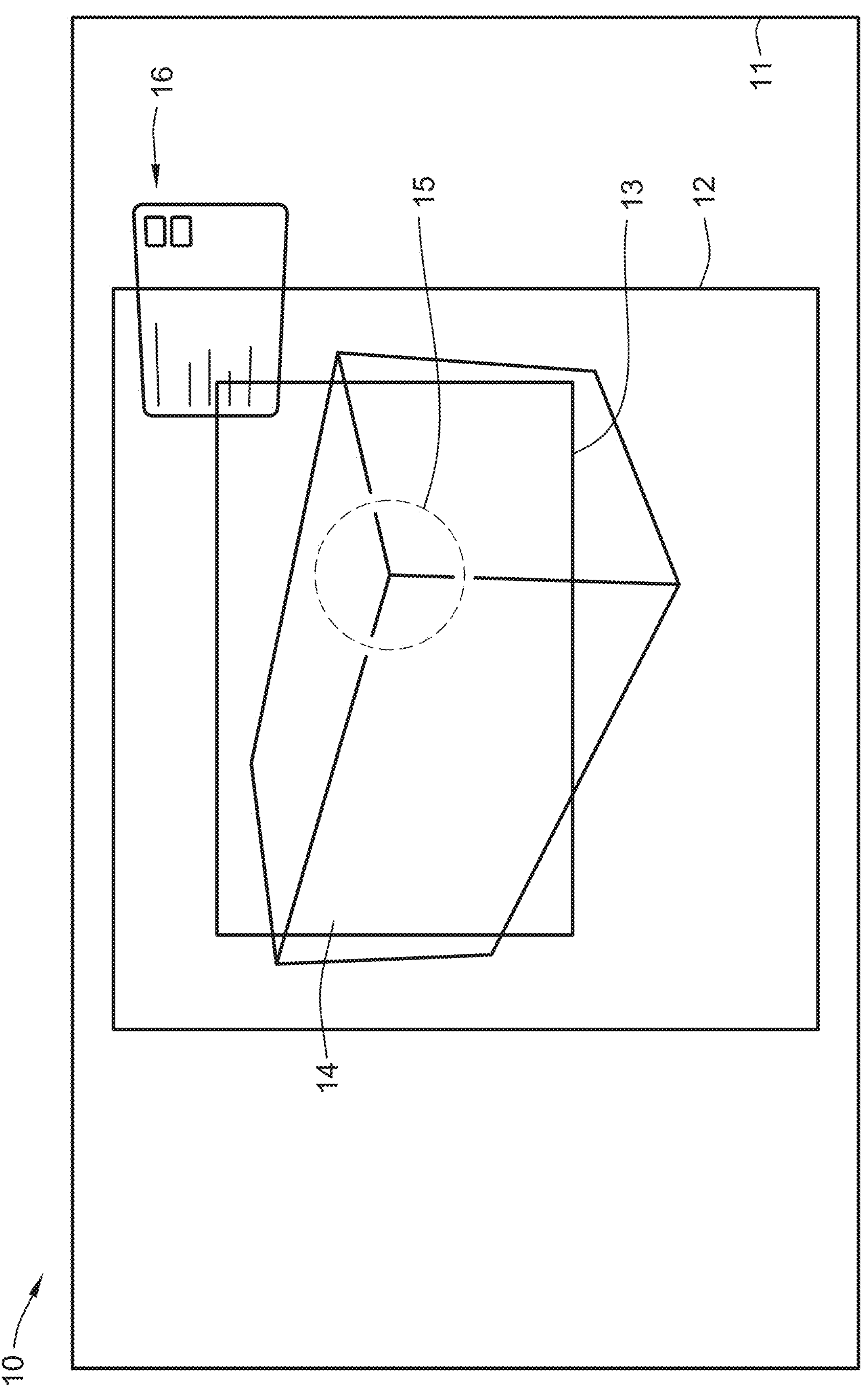
FIGS. 1-2 are schematic representations of various fields of view as seen by a user wearing an HMD in accordance with previously known approaches and with the present disclosure, respectively.

Referring now to the drawings, wherein like numerals indicate like parts in the several views, an AR system 30 for use by a user 80 in a surrounding environment 90, and various methods 100, 200, 300, 400, 500, 600 of operating an AR system 30, are shown and described herein.

In contrast with the abovementioned customary approaches, the AR system 30 and methods 100, 200, 300, 400, 500, 600 solve the technical problem of having a limited viewing area for the display of virtual objects 14 within an HMD 40, by the technical effect of providing an expanded and enhanced user FOV 20 and bidirectional control, thereby providing benefits and technical advantages which are not taught or suggested by the abovementioned customary approaches. These benefits and technical advantages include expanding the AR FOV 13 as viewed by the user 80 and offering expanded input and control capability by the inclusion of an HCD 50 as described below, which offers greater functionality as compared to previous approaches. Additionally, the system 30 and methods 100, 200, 300, 400, 500, 600 of the present disclosure apply not only to augmented reality (AR) and virtual reality (VR) applications, but also to mixed reality (MR) and extended reality (XR) applications as well.

Figure 2:
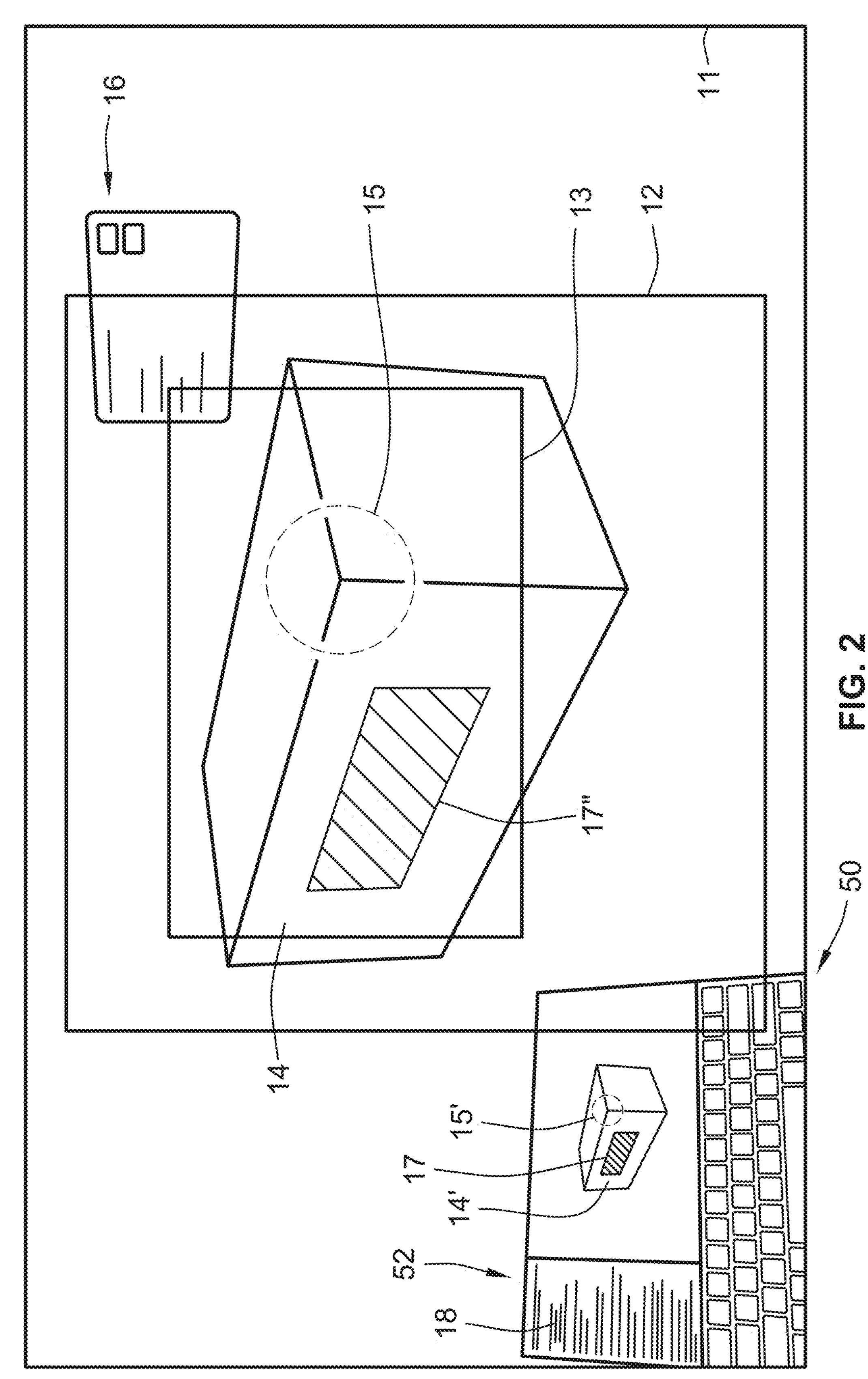
Figure 3:
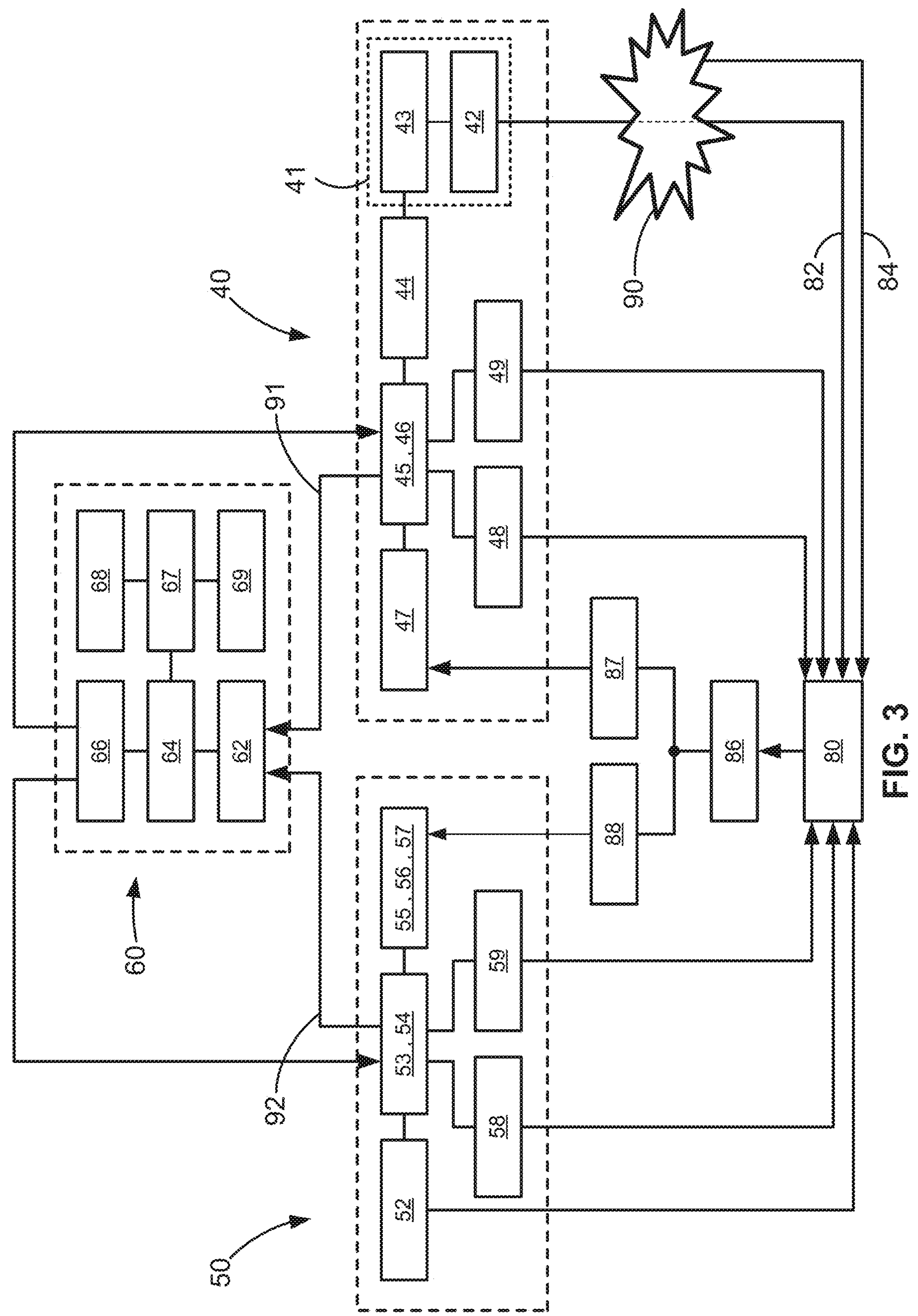
FIG. 3 is a block diagram of an AR system in accordance with the present disclosure.

FIG. 1 shows a schematic representation of various fields of view (FOVs) that may be seen by a user 80 when wearing an HMD 40 in accordance with previously known AR and VR approaches, and FIG. 2 shows an example of how these FOVs appear to a user 80 when wearing an HMD 40 as part of the present AR system 30 which is shown schematically in the block diagram of FIG. 3.

As illustrated in FIG. 1, the user 80 has a relatively large natural FOV 11. (This is essentially the same FOV that a user 80 would have when not wearing an HMD.) When wearing a conventional HMD, the typical VR FOV 12 is much smaller than the user's natural FOV 11, and the typical AR FOV 13 is even smaller than the typical VR FOV 12. A conventional AR/VR system may project a virtual image 14 onto its HMD, such as the three-dimensional (3D) box 14 shown in FIG. 1, which is projected in two dimensions (2D) onto the viewscreen of a VR HMD or onto the transparent lens of an AR HMD. The AR/VR system may also project one or more indications or highlight symbols 15 (such as the dashed circle highlighting one corner of the virtual 3D box 14), as well as a graphical user interface (GUI) window 16 which the user 80 may interact with. If the virtual object 14 is relatively large, it might be fully visible within the VR FOV 12, but it might not fully fit within the AR FOV 13. Similarly, depending on where certain objects are projected within the AR/VR FOVs 12, 13, objects such as the GUI window 16 might lie partially out of the VR FOV 12 and even further out of the AR FOV 13. Thus, any digital/virtual objects 14, 15, 16 projected by the conventional HMD will compete for viewing space within the AR/VR FOVs 12, 13. That is, there may not be room within the AR/VR FOVs 12, 13 to show all parts of all digital/virtual objects 14, 15, 16.

In contrast, the present AR system 30 and methods 100, 200, 300, 400, 500, 600 help to overcome these limitations of the conventional HMD and AR/VR system by providing an enhanced or extended user FOV 20, as illustrated in FIG. 2. Here, the same natural FOV 11, VR FOV 12 and AR FOV 13 are shown, as viewed by a user 80 wearing an HMD 40 according to the present disclosure, but note that a handheld computing device (HCD) 50 is also shown in the lower-left corner of the drawing. The HCD 50 shown here is being held by the user 80 in the lower-left of his or her natural FOV 11, and outside of the AR FOV 13, so the HCD 50 is visible to the user 80. (Note that the present system 30 and methods 100, 200, 300, 400, 500, 600 utilize AR, rather than VR, so the VR FOV 12 is irrelevant as concerns the present system 30 and methods 100, 200, 300, 400, 500, 600. However, the VR FOV 12 is included in FIG. 2 just for reference.)

Also note that the HCD 50 has an HCD display 52 on which a rendering of the virtual image 14 and the indication/highlight 15 are shown. That is, the HCD 50 may be used to display a copy of the virtual image 14 and indication/highlight 15 that are projected within the HMD 40. Note that as used herein and in the drawings, the digital/virtual objects 14, 15, 16 displayed on the HMD 40 are written without accent marks, whereas any copies of these digital/virtual objects 14, 15, 16 that are copied or displayed on the HCD display 52 are written with accent marks. Thus, reference numerals 14 and 15 represent a virtual image and an indication/highlight projected by the HMD 40, and reference numerals 14' and 15' represent respective copies of the virtual image and indication/highlight that are displayed on the HCD display 52.

Furthermore, three additional points may be noted regarding the HCD 50 and its interaction with the HMD 40 and its FOVs 11, 13.

First, note that while not all of the virtual image 14 may be seen through the HMD 40 (i.e., the virtual image 14 projected within the HMD 40 does not fully fit within the AR FOV 13), the virtual image copy 14' displayed on the HCD 40 may be seen in its entirety.

Second, note that various graphical digital content 17 (such as the cross-hatched rectangle) and textual digital content 18 (such as the column of text) may be added to and displayed on the HCD 40, and copies 17", 18" of some or all of this digital content 17, 18 may be projected within the HMD 40. Note that as used herein and in the drawings, any digital content 17, 18 displayed on the HCD 50 is written without accent marks, whereas any copies of this digital content 17, 18 that are copied or projected within the HMD 40 are written with double accent marks. Thus, reference numeral 17 represents an item of digital content displayed on the HCD 50, and reference numeral 17" represents a copy of this digital content that is displayed on the HMD 40.

Third, note that the HCD 50 may serve as an interface which the user 80 may use to manipulate and interact with the various digital objects and content 99 that are displayed by the HCF 50 and/or projected within the HMD 40. For example, the HCD 50 may include various buttons/keys 56 (e.g., a physical keyboard comprising a number of keys) and/or a touchscreen/touchpad 57, which the user 80 may use to select, move, highlight, cause to appear, cause to disappear, or otherwise change any digital objects or content, whether appearing only within the HMD 40 (e.g., the GUI window 16), only on the HCD display 52 (e.g., the textual digital content 18), or on both the HMD 40 and the HCD 50 (e.g., the virtual images 14, 14', the indications/highlights 15, 15' and the shaded rectangles 17, 17"). For instance, the user 80 may use the touchscreen/touchpad 57 on the HCD 50 to cause a cursor to move across the HCD display 52 and come to rest on a side of the 3D box 14'. The user 80 may then make one or more finger gestures $88_g$ (described in more detail below) on the touchscreen/touchpad 57, or may press one or more buttons/keys 56, to cause the cross-hatched rectangle 17 to appear where the cursor is pointing, and a copy 17" of this rectangle 17 may appear within the HMD 40 at the same place in the projected AR FOV 13 (i.e., on the side of the 3D box 14). The user 80 may also add or create some textual digital content 18 (e.g., notes or comments) on the HCD 50, and this digital content 18 may be copied and projected within the HMD 40, or (as shown in FIG. 2) it may not be copied and projected within the HMD 40. Thus, the user 80 may utilize the HCD 50 as an interface to interact with digital objects and content that are displayed on either or both of the HMD 40 and the HCD 50.

FIG. 3 shows a block diagram of an AR system 30 in accordance with the present disclosure, with the system 30 comprising an HMD 40, and HCD 50 and a control module 60.

The HMD 40 has a display 41 having a lens 42 that is generally transparent (and/or permits video pass-through functionality) which the user 80 may look through when wearing the HMD 40 to see his or her surrounding environment 90. (As illustrated at the bottom-right of FIG. 3, the user 80 may have a view 82 of the surrounding environment 90 through the transparent lens 42, as well as a direct view 84 of the surrounding environment 90 around the outer periphery of the transparent lens 42.) The display 41 also includes a predetermined and smaller portion 43 of the lens 42, which is configured such that one or more virtual images 14 may be projected or displayed thereon (and/or therethrough) within an AR FOV 13 for viewing by the user 80. (That is, the predetermined portion 43 of the lens 42 defines the AR FOV 13.) The HMD 40 may include one or more projectors 44 for projecting the one or more virtual images 14 onto the display 41 (i.e., onto the predetermined portion 43 of the lens 42) such that the image(s) 14 may be viewed by the user 80 who is wearing the HMD 40. The HMD 40 may assume various forms, including glasses, visors, and 2D/3D holographic projection devices.

Figure 4:
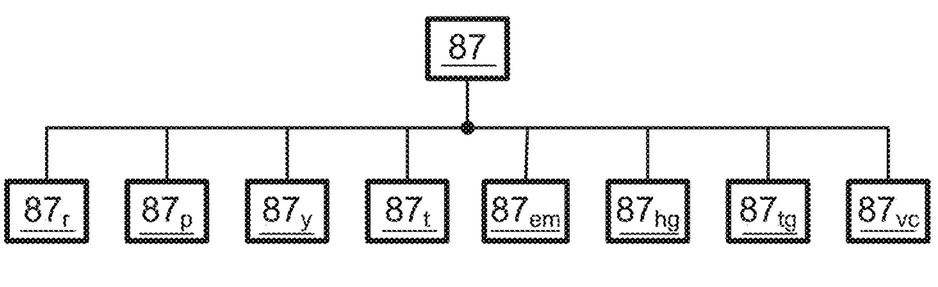
FIG. 4 is a block diagram illustrating a first set of user actions.

The HMD 40 also includes a first group of sensors 47 (e.g., motion sensors) configured for sensing a user action 86 (such as, but not limited to, an action from a first set 87 of user actions 86 from the user 80) and/or a met condition 95 (e.g., a predetermined condition 93 which has satisfied or met one or more predetermined criteria 94). As illustrated in FIG. 4, the first set 87 of user actions 86 may include one or more of a roll $87_r$ of the HMD 40, a pitch $87_p$ of the HMD 40, a yaw $87_y$ of the HMD 40, a translation $87_t$ of the HMD 40, an eye movement $87_{em}$, a hand gesture $87_{hg}$, a tool gesture $87_{tg}$ and a voice command $87_{vc}$ spoken by the user 80 to the HMD 40. The HMD 40 may further include an HMD processor 45 (e.g., a microprocessor) configured to execute applications or instructions 46, as well as one or more speakers 48 and one or more vibrating elements 49 for alerting or communicating with the user 80.

The HCD 50 has an HCD display 52 and a second group of sensors 55 configured for sensing a user action 86 (such as, but not limited to, an action from a second set 88 of user actions 86 pertaining to the one or more virtual images 14, 14') and/or for sensing the met condition 95. (Note that here and elsewhere throughout the present disclosure, the pair of reference numerals 14, 14'—as well as the pair of reference numerals 17, 18—may be used to represent any number and types of digital or virtual objects/images/content, including those appearing only within the HMD 40, those appearing only on the HCD display 52, and those appearing on both the HMD 40 and the HCD 50. Additionally or alternatively, the reference numeral 99 may also be used herein to represent these same types of digital content.) The sensors 55 may include motion sensors, buttons/keys 56 which may be pressed by the user 80, and a touchscreen/touchpad 57 which may sense taps or other gestures or actions made by the user 80. (Additionally, the first and second groups of sensors 47, 55 may include one or more detectors of the met condition 95, such as circuits, registers, software routines, algorithms, etc. which are configured for detecting when a predetermined condition has been met and/or is present.)

Figure 5:
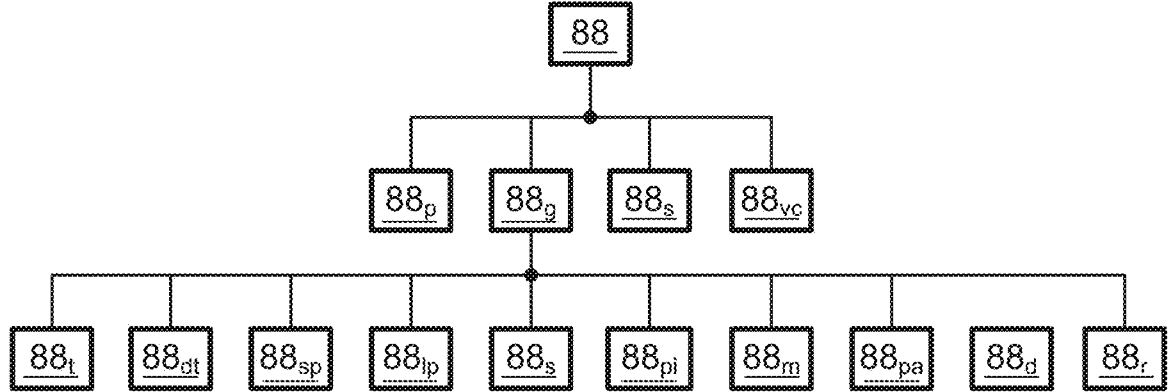
FIG. 5 is a block diagram illustrating a second set of user actions.

As illustrated in FIG. 7, the HCD 50 may be a smartphone 50$_s$, a tablet 50$_t$ or a laptop computer 50$_{lc}$. And as illustrated in FIG. 5, the second set 88 of user actions 86 may include one or more of a push 88$_p$ of a button 56 on the HCD 50, a gesture 88$_g$ on a touchscreen/touchpad 57 of the HCD 50, a shaking 88$_s$ of the HCD 50 and a voice command 88$_v$, spoken to the HCD 50. The gesture 88$_g$ on the touchscreen/touchpad 57 may include one or more of a tap 88$_t$, a double tap 88$_{dt}$, a short press 88$_{sp}$, a long press 88$_{lp}$, a swipe 88$_s$, a pinch 88$_{pi}$, a magnification 88$_m$, a pan 88$_{pa}$, a drag 88$_d$ and a rotation 88$_r$. The HCD 50 may further include an HCD processor 53 (e.g., a microprocessor) configured to execute applications or instructions 54, as well as one or more speakers 58 and one or more vibrating elements 59 for alerting or communicating with the user 80.

The control module 60 is operatively connected with one or both of the HMD 40 and the HCD 50. In some embodiments, the control module 60 is configured to cause digital content 99 (such as the one or more virtual images 14, 14') to be displayed on the predetermined portion 43 of the lens 42 within the HMD 40 and on the HCD display 52 of the HCD 50 (e.g., simultaneously). In other embodiments, the control module 60 is configured to cause a modification 89 of digital content 99 within the HMD 40 and/or on the HCD 50 (as further described below), based on the first set 87 of user actions 86, the second set 88 of user actions 86, or both sets 87, 88 of user actions 86. For example, a user action 86 and/or a met condition 95 may be sensed by the sensors of one device 40, 50, and the control module 60 may cause an action to be executed on the other device 40, 50.

The control module 60 may include an input module 62 for receiving a first command 91 from the HMD processor 45 and a second command 92 from the HCD processor 53. The first command 91 may be generated by the HMD processor 45 based on the first set 87 of user actions 86 which are received by the first group of sensors 47, and the second command 92 may be generated by the HCD processor 53 based on the second set 88 of user actions 86 which are received by the second group of sensors 55, the buttons/keys 56 or the touchscreen/touchpad 57.

The control module 60 may also include a control module processor 64 that is operatively connected with the input module 62 for receiving the first and second commands 91, 92, and with an output module 66 for providing outputs or feedback to the HMD and HCD processors 45, 53, such as for displaying or projecting one or more virtual images 14, 14' within the HMD 40 and/or the HCD 50. The control module processor 64 may be in communication with a memory 67 which contains or has access to a set of images or models 68 and an instruction set 69 which may be executed by the control module processor 64.

Figure 6:
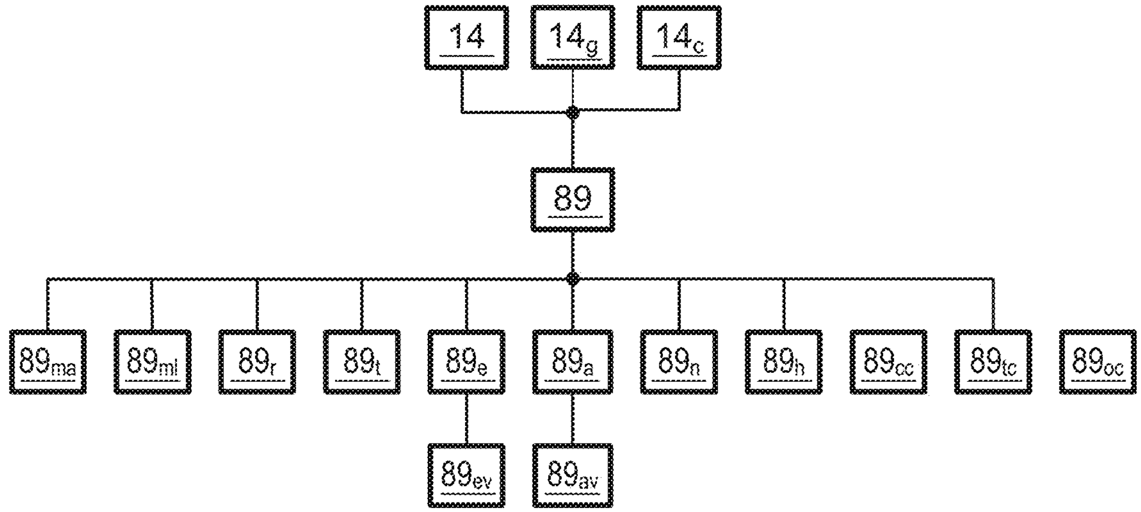
FIG. 6 is a block diagram showing various modifications which may be made to one or more virtual images.

As illustrated in FIG. 6, the abovementioned modification 89 of the one or more virtual images 14, 14' may include one or more of a magnification 89$_{ma}$, a minification 89$_{mi}$, a rotation 89$_r$, a translation 89$_t$, an explosion 89$_e$ into an exploded view 89$_{ev}$, an assembling 89$_a$ into an assembled view 89$_{av}$, a notation 89$_n$, a highlighting 89$_h$, a color change 89$_{cc}$, a texture change 89$_{tc}$ and an opacity change 89$_{oc}$ of the one or more virtual images 14, 14' or of a grouping 14$_g$ or a respective component 14$_c$ of the one or more virtual images 14, 14'.

As mentioned above, the AR system 30 may be configured to enable the user 80 to add digital content 17, 18 to the HCD display 52 without the digital content 17, 18 being displayed on the lens 42 of the HMD 40. Additionally or alternatively, the AR system 30 may be configured to enable the user 80 to add digital content 17, 18 to the HCD display 52 with the digital content 17, 18 also being displayed on the lens 42 of the HMD 40. For example, as shown in FIG. 2, a cross-hatched rectangular area may be added as graphical digital content 17 to the HCD display 52, and this content 17 may be duplicated or projected within the HMD 40 as element 17', whereas the textual digital content 18 may appear only on the HCD 50 without being duplicated or displayed within the HMD 40.

Additionally, the AR system 30 may be configured to enable the user 80 to add digital content 17, 18 to the HCD display 52 and to utilize one or more applications 54 on the HCD 50 for processing (i.e., modifying, acting upon, or using) the digital content 17, 18. For example, the textual digital content 18 shown in FIG. 2 may be processed by an email application 54 that is loaded into or otherwise available to the HCD processor 53, resulting in an email message being sent which contains the textual digital content 18. As another example, an editing application or markup utility 54 may be invoked by the HCD processor 53 so that edits, highlights, notations or other markups may be added to the textual digital content 18. As a further example, a drawing or graphics application 54 may be invoked or accessed by the HCD processor 53, so that the cross-hatched rectangular area shown in FIG. 2 may be added to the HCD display 52 as an element of graphical digital content 17, and then the drawing or graphics application 54 may be used to make modifications 89 to the element.

In some arrangements, the AR system 30 may be configured to be "bidirectional"—e.g., the control of the one or more virtual images 14, 14' may originate from the HMD 40 or from the HCD 50. For example, the first group of sensors 47 associated with the HMD 40 may detect a user action 86 from the user 80—such as a roll 87$_r$ of the user's head, or a movement or hand gesture 87$_{hg}$ made by the user 80 while wearing a haptic glove- and the HMD 40 may cause a modification 89 of the one or more virtual images 14, 14' within the HMD 40 and/or on the HCD 50. Or, as another example, the second group of sensors 53 associated with the HCD 50 may detect a user action 86—such as CCC—and the HCD 50 may cause a modification 89 of the one or more virtual images 14, 14' within the HMD 40 and/or on the HCD 50. As a further example, a user action 86 and/or a met condition 95 may be sensed or detected by one of the HMD (via the first group of sensors) and the HCD (via the second group of sensors), and this sensed user action 86 and/or sensed met condition 95 may cause an action to be executed on the other of the HMD and the HCD; that is, a first device 40, 50 may be used as an "input device" (i.e., for inputting one or more inputs $99_i$), and a second device 40, 50 may be used as a "feedback device" (i.e., for responding to the first device's inputs $99_1$). Here, the input $99_i$ may include one or more of the user action 86, the met condition 95, a command generated in response to sensing the user action 86 and/or the met condition 95, and input generated by an application or service in response to the user action 86 and/or the met condition 95.

The AR system 30 may also include a local ad hoc connection 76 between the HMD 40 and the HCD 50 for facilitating communication and transfer of data packets therebetween, and the control module 60 may be embedded as a respective portion 40', 50' of one or both of the HMD 40 and the HCD 50. The local ad hoc connection 76 may be wired (e.g., Ethernet) or wireless (e.g., Bluetooth, wi-fi, cellular). The respective portions 40', 50' of the HMD 40 and the HCD 50 may comprise a portion of the hardware and/or software/instructions associated with and/or embedded within the HMD 40 or HCD 50.

FIGS. 8-10 show block diagrams of various arrangements of the HMD 40 and the HCD 50 according to first through third configurations I-III of the AR system 30, respectively.

In the first configuration I shown in FIG. 8, the HMD 40 and the HCD 50 may be communicatively coupled with each other via a local ad hoc connection 76, with the control module 60 being embedded within the HCD 50 as a portion 50' of the HCD 50.

In the second configuration II shown in FIG. 9, the HMD 40 and the HCD 50 may be communicatively coupled with each other via a local ad hoc connection 76, with the control module 60 being embedded within the HMD 40 as a portion 40' of the HMD 40.

In the first configuration III shown in FIG. 10, the HMD 40 and the HCD 50 may be communicatively coupled with each other via a local ad hoc connection 76, with the control module 60 being embedded within both the HMD 40 and the HCD 50 as respective portions 40', 50' of the HMD 40 and HCD 50. For example, part of the control module 60 may be embedded within the HMD portion 40', and the remainder of the control module 60 may be embedded within the HCD portion 50'.

The AR system 30 may further include a server 70 operatively connected with the HMD 40 via a first server connection 72 and with the HCD 50 via a second server connection 74, for facilitating communication with and between the HMD 40 and the HCD 50, wherein the control module 60 is embedded as a respective portion 40', 50', 70' of one or more of the HMD 40, the HCD 50 and the server 70. The first and second server connections 72, 74 may be wired (e.g., Ethernet) or wireless (e.g., Bluetooth, wi-fi, cellular). Here, the respective portions 40', 50', 70' of the HMD 40, the HCD 50 and the server 70 may comprise a portion of the hardware and/or software/instructions associated with the HMD 40 or HCD 50 or server 70.

FIGS. 11-18 are block diagrams of various arrangements of the HMD 40, the HCD 50 and the server 70 according to fourth through eleventh configurations IV-XI of the AR system 30, respectively.

In the fourth configuration IV shown in FIG. 11, the HMD 40 and the HCD 50 may be communicatively coupled with each other via a local ad hoc connection 76, the server 70 may be communicatively coupled with the HMD 40 and the HCD 50 via the first and second server connections 72, 74, respectively, and the control module 60 may be provided as a separate stand-alone module or device, rather than being embedded within the HMD 40, the HCD 50 and the server 70 as respective portions 40', 50', 70' thereof. In this fourth configuration IV, the control module 60 may be communicatively coupled with each of the HMD 40, the HCD 50 and the server 70.

In the fifth configuration V shown in FIG. 12, the HMD 40 and the HCD 50 may be communicatively coupled with each other via a local ad hoc connection 76, the server 70 may be communicatively coupled with the HMD 40 and the HCD 50 via the first and second server connections 72, 74, respectively, and the control module 60 may be embedded within the server 70 as a portion 70' of the server 70.

In the sixth configuration VI shown in FIG. 13, the HMD 40 and the HCD 50 may be communicatively coupled with each other via a local ad hoc connection 76, the server 70 may be communicatively coupled with the HMD 40 and the HCD 50 via the first and second server connections 72, 74, respectively, and the control module 60 may be embedded within the HCD 50 as a portion 50' of the HCD 50.

In the seventh configuration VII shown in FIG. 14, the HMD 40 and the HCD 50 may be communicatively coupled with each other via a local ad hoc connection 76, the server 70 may be communicatively coupled with the HMD 40 and the HCD 50 via the first and second server connections 72, 74, respectively, and the control module 60 may be embedded within the HMD 40 as a portion 40' of the HMD 40.

In the eighth configuration VIII shown in FIG. 15, the HMD 40 and the HCD 50 may be communicatively coupled with each other via a local ad hoc connection 76, the server 70 may be communicatively coupled with the HMD 40 and the HCD 50 via the first and second server connections 72, 74, respectively, and the control module 60 may be embedded within both the HMD 40 and the HCD 50 as respective portions 40', 50' thereof.

In the ninth configuration IX shown in FIG. 16, the HMD 40 and the HCD 50 may be communicatively coupled with each other via a local ad hoc connection 76, the server 70 may be communicatively coupled with the HMD 40 and the HCD 50 via the first and second server connections 72, 74, respectively, and the control module 60 may be embedded within both the HCD 50 and the server 70 as respective portions 50', 70' thereof.

In the tenth configuration X shown in FIG. 17, the HMD 40 and the HCD 50 may be communicatively coupled with each other via a local ad hoc connection 76, the server 70 may be communicatively coupled with the HMD 40 and the HCD 50 via the first and second server connections 72, 74, respectively, and the control module 60 may be embedded within both the HMD 40 and the server 70 as respective portions 40', 70' thereof.

In the eleventh configuration XI shown in FIG. 18, the HMD 40 and the HCD 50 may be communicatively coupled with each other via a local ad hoc connection 76, the server 70 may be communicatively coupled with the HMD 40 and the HCD 50 via the first and second server connections 72, 74, respectively, and the control module 60 may be embedded within each of the HMD 40, the HCD 50 and the server 70 as respective portions 40', 50', 70' thereof.

In any of the foregoing configurations in which the control module 60 is embedded within two or more of the HMD 40, the HCD 50 and the server 70, a part of the control module 60 and/or its functionality may be embedded within or associated with each of the two or more of the respective portions 40', 50', 70'.

Figure 19:
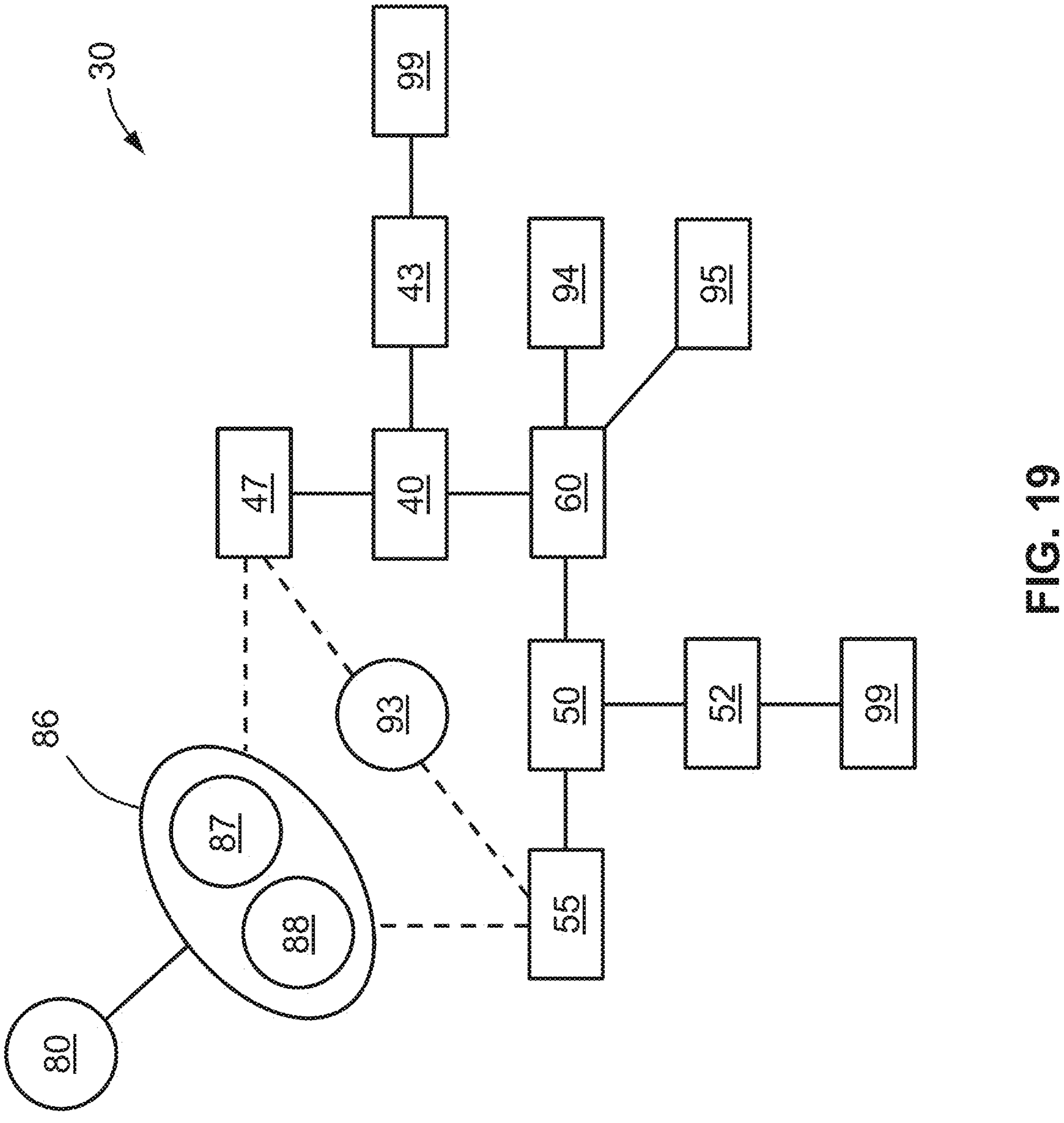
FIG. 19 is a block diagram of components of an AR system.

FIG. 19 shows a block diagram of various components and aspects of an AR system 30 according to the present disclosure. As shown, the AR system 30 includes an HMD 40, and HCD 50 and a control module 60 operatively connected with the HMD 40 and the HCD 50, such as by wireless or wired connections. The HMD 40 includes a predetermined portion 43 of a lens 42 on and/or through which digital content 99 may be displayed for the user 80; similarly, the HCD 50 includes an HCD display 52 on which digital content 99 may be displayed for the user 80. The HMD 40 and the HCD 50 include respective first and second groups of sensors 47, 55 which are configured to sense or detect various user actions 86, including the respective first and second sets 87, 88 of user actions 86. The sensors 47, 55 may also be configured to sense or detect various conditions 93, which may be indicative of events, situations or conditions outside the AR system 30 and/or within the AR system 30. The control module 60 may contain or have access to various criteria 94 for assessing the sensed conditions 93 in order to determine whether any met conditions 95 are present.

FIGS. 20-25 show flowcharts of various methods for operating an AR system 30 in accordance with the present disclosure. More specifically, these six drawings show respective flowcharts for six related but different methods, designated below as a first method 100, a second method 200, a third method 300, a fourth method 400, a fifth method 500 and a sixth method 600. Each of these six methods involves an AR system 30 which includes an HMD 40 having a first group of sensors 47 configured for sensing a user action 86 and/or a met condition 95, an HCD 50 having a second group of sensors 55 configured for sensing the user action 86 and/or the met condition 95, and a control module 60 operatively connected with one or both of the HMD 40 and the HCD 50.

Figure 20:
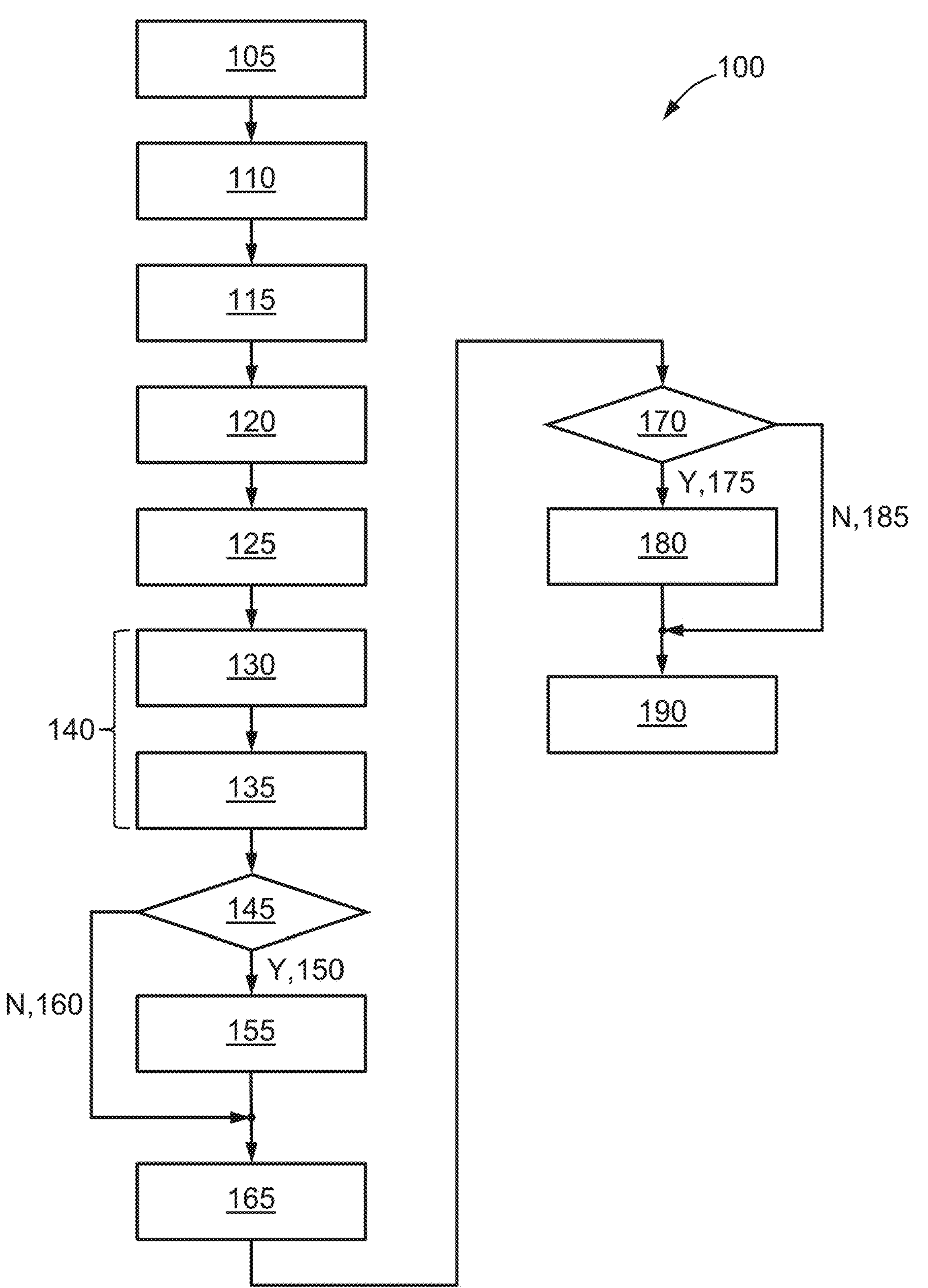

FIG. 20 shows the first method 100, which is a method of displaying digital content 99 within an AR system 30. The first method 100 includes, at block 110, sensing a user action 86 and/or a met condition 95, and, at block 125, simultaneously displaying the digital content 99 on the HMD 40 and on the HCD 50 in response to the sensed user action 86 and/or the sensed met condition 95. The method 100 may optionally also include one or more of the following: (i) at block 105, providing the AR system 30; (ii) at block 115, receiving a first command from the HMD based on the sensed user action 86 and/or the sensed met condition 95, and at block 130, modifying the digital content on the HCD based on the received first command; (iii) at block 120, receiving a second command from the HCD based on the sensed user action 86 and/or the sensed met condition 95, and at block 135, modifying the digital content on the HMD based on the received second command; (iv) at block 145, determining whether the modification of digital content on one of the devices 40, 50 in either of blocks 130 and 135 should be duplicated or performed on the other device 40, 50 as well (i.e., should the first modification on one of the devices 40, 50 be "coupled" with a second modification on the other of the devices 40, 50), with an affirmative (e.g., "Y" or "Yes") answer causing the process flow to proceed along branch 150, and a negative (e.g., "N" or "No") answer causing the process flow to proceed along branch 160; (v) at block 140, making a first modification of the digital content on one of the HMD 40 and the HCD 50 (where the first modification may be either of the digital content modifications of blocks 130 and 135), and then, at branch 150 and block 155, simultaneously making a second modification of the digital content on the other of the HMD and the HCD (e.g., wherein the second modification is substantially the same as the first modification); (vi) at block 140 and branch 160, making a first modification of the digital content on one of the HMD 40 and the HCD 50 without modifying the digital content simultaneously on the other of the HMD and the HCD; (vii) at block 165, displaying additional digital content on the HCD 50; (viii) at block 170, determining whether the additional digital content should also be displayed on the HMD 40, with an affirmative (e.g., "Y" or "Yes") answer causing the process flow to proceed along branch 175, and a negative (e.g., "N" or "No") answer causing the process flow to proceed along branch 185; (ix) at block 165, displaying additional digital content on the HCD 50, and then, at branch 175 and block 180, simultaneously displaying the additional digital content on the HMD 40; (x) at block 165 and branch 185, displaying additional digital content on the HCD 50 without simultaneously displaying the additional digital content on the HMD 40; and (xi) at block 190, utilizing one or more applications on the HCD for processing the additional digital content.

Figure 21:
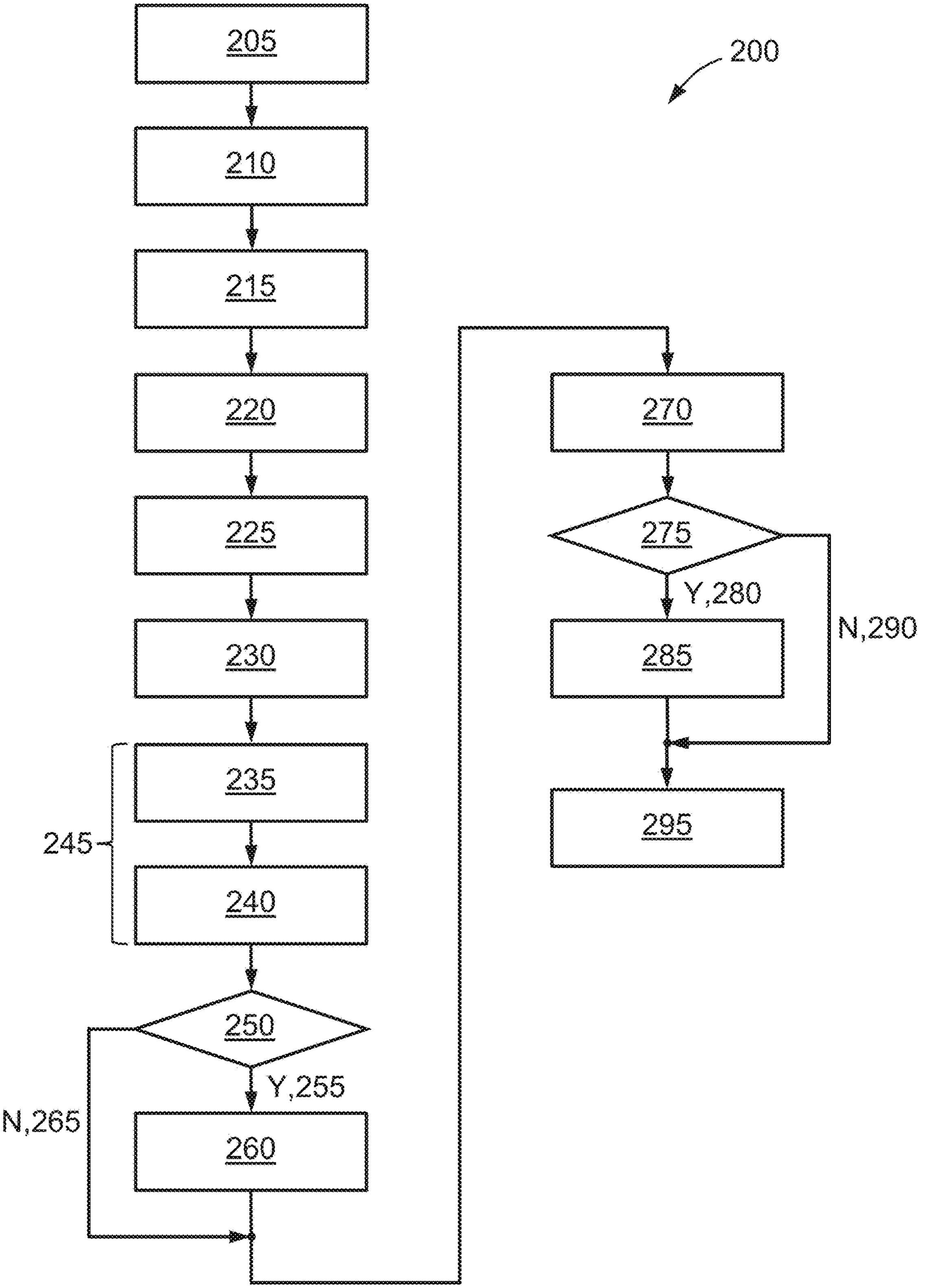

FIG. 21 shows the second method 200, which is a method of using an AR system 30 by a user 80 in a surrounding environment 90. The method 200 includes: at block 210, executing a user action 86 by the user 80; at block 215, sensing the user action 86 by one of the HMD, via the first group of sensors, and the HCD, via the second group of sensors; and, at block 230, causing, by the control module, digital content to be displayed simultaneously on the HMD and on the HCD based on the sensed user action 86. The method 200 may optionally also include one or more of the following: (i) at block 205, providing the AR system 30; (ii) at block 220, receiving a first command from the HMD based on the sensed user action 86, and at block 235, modifying the digital content on the HCD based on the received first command; (iii) at block 225, receiving a second command from the HCD based on the sensed user action 86, and at block 240, modifying the digital content on the HMD based on the received second command; (iv) at block 250, determining whether the modification of digital content on one of the devices 40, 50 in either of blocks 235 and 240 should be duplicated or performed on the other device 40, 50 as well, with an affirmative (e.g., "Y" or "Yes") answer causing the process flow to proceed along branch 255, and a negative (e.g., "N" or "No") answer causing the process flow to proceed along branch 265; (v) at block 245, making a first modification of the digital content on one of the HMD 40 and the HCD 50 (where the first modification may be either of the digital content modifications of blocks 235 and 240), and then, at branch 255 and block 260, simultaneously making a second modification of the digital content on the other of the HMD and the HCD (e.g., wherein the second modification is substantially the same as the first modification); (vi) at block 245 and branch 265, making a first modification of the digital content on one of the HMD 40 and the HCD 50 without modifying the digital content simultaneously on the other of the HMD and the HCD; (vii) at block 270, displaying additional digital content on the HCD 50; (viii) at block 275, determining whether the additional digital content should also be displayed on the HMD 40, with an affirmative (e.g., "Y" or "Yes") answer causing the process flow to proceed along branch 280, and a negative (e.g., "N" or "No") answer causing the process flow to proceed along branch 290; (ix) at block 270, displaying additional digital content on the HCD 50, and then, at branch 280 and block 285, simultaneously displaying the additional digital content on the HMD 40; (x) at block 270 and branch 290, displaying additional digital content on the HCD 50 without simultaneously displaying the additional digital content on the HMD 40; and (xi) at block 295, utilizing one or more applications on the HCD for processing the additional digital content.

Figure 22:
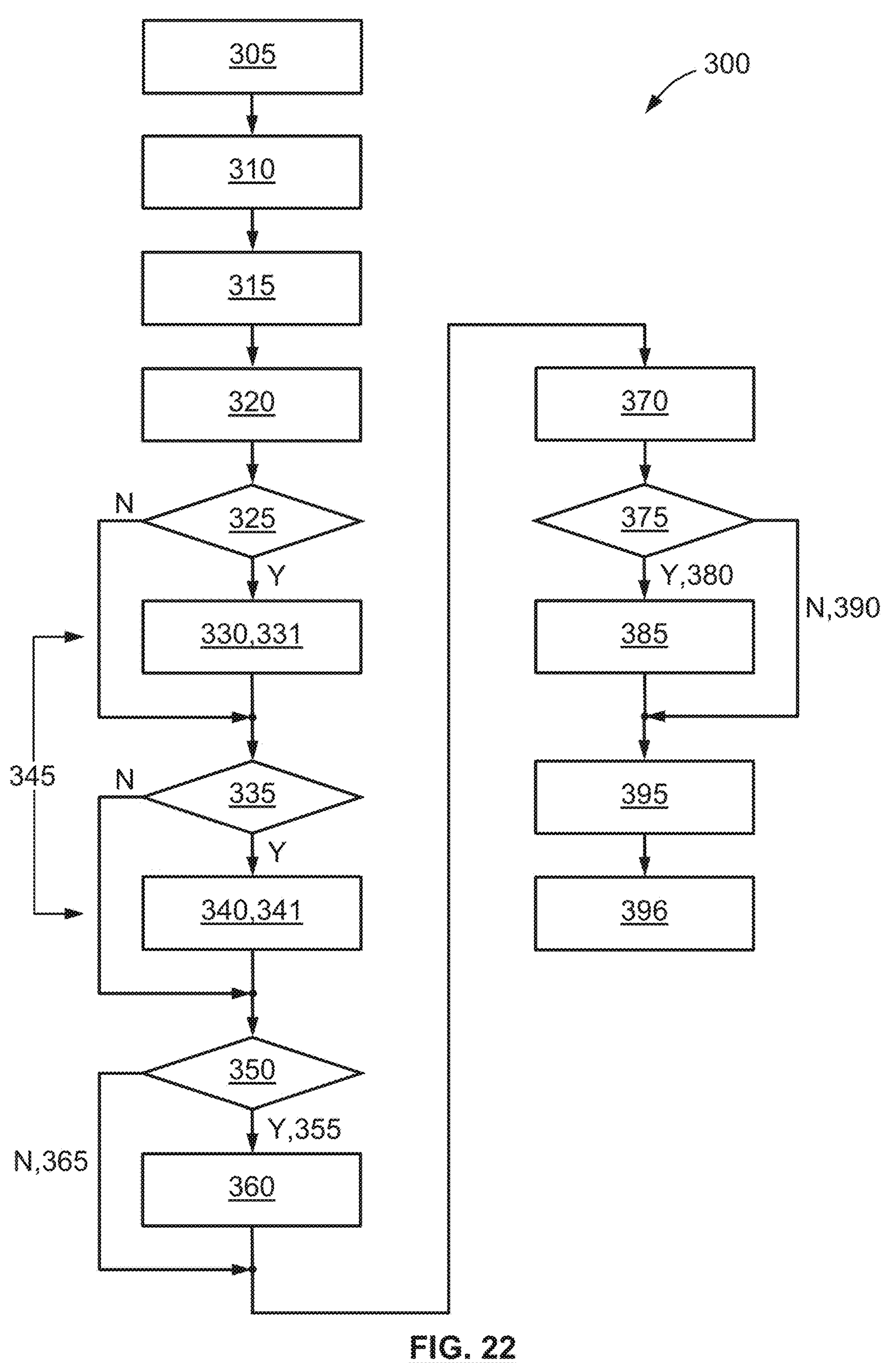

FIG. 22 shows the third method 300, which is a method of modifying digital content 99 within an AR system 30. The method 300 includes: at block 310, sensing a user action 86 and/or a met condition 95; at block 325, determining whether the user action 86 and/or the met condition 95 is sensed by the first group of sensors, and if so, then, at block 330, modifying digital content displayed on the HCD based on the sensed user action 86 and/or the sensed met condition 95; and, at block 335, determining whether the user action 86 and/or the met condition 95 is sensed by the second group of sensors, and if so, then, at block 340, modifying digital content displayed on the HMD based on the sensed user action 86 and/or the sensed met condition 95. The method 300 may optionally also include one or more of the following: (i) at block 305, providing the AR system 30; (ii) at block 315, receiving a first command from the HMD based on the sensed user action 86 and/or the sensed met condition 95, and at block 331, modifying the digital content on the HCD based on the received first command; (iii) at block 320, receiving a second command from the HCD based on the sensed user action 86 and/or the sensed met condition 95, and at block 341, modifying the digital content on the HMD based on the received second command; (iv) at block 350, determining whether the modification of digital content on one of the devices 40, 50 in either of blocks 330, 331 and 340, 341 should be duplicated or performed on the other device 40, 50 as well, with an affirmative (e.g., "Y" or "Yes") answer causing the process flow to proceed along branch 355, and a negative (e.g., "N" or "No") answer causing the process flow to proceed along branch 365; (v) at block 345, making a first modification of the digital content on one of the HMD 40 and the HCD 50 (where the first modification may be either of the digital content modifications of blocks 330, 331 and 340, 341), and then, at branch 355 and block 360, simultaneously making a second modification of the digital content on the other of the HMD and the HCD (e.g., wherein the second modification is substantially the same as the first modification); (vi) at block 345 and branch 365, making a first modification of the digital content on one of the HMD 40 and the HCD 50 without modifying the digital content simultaneously on the other of the HMD and the HCD; (vii) at block 370, displaying additional digital content on the HCD 50; (viii) at block 375, determining whether the additional digital content should also be displayed on the HMD 40, with an affirmative (e.g., "Y" or "Yes") answer causing the process flow to proceed along branch 380, and a negative (e.g., "N" or "No") answer causing the process flow to proceed along branch 390; (ix) at block 370, displaying additional digital content on the HCD 50, and then, at branch 380 and block 385, simultaneously displaying the additional digital content on the HMD 40; (x) at block 370 and branch 390, displaying additional digital content on the HCD 50 without simultaneously displaying the additional digital content on the HMD 40; (xi) at block 395, utilizing one or more applications on the HCD for processing the additional digital content; and (xii) at block 396, simultaneously displaying the digital content on the HMD and on the HCD based on the sensed user action 86 and/or the sensed met condition 95. Note that blocks 330 and 331 have been combined into one block, as they both relate to modifying digital content on the HCD; similarly, blocks 340 and 341 have been combined into one block, as they both relate to modifying digital content on the HMD.

Figure 23:
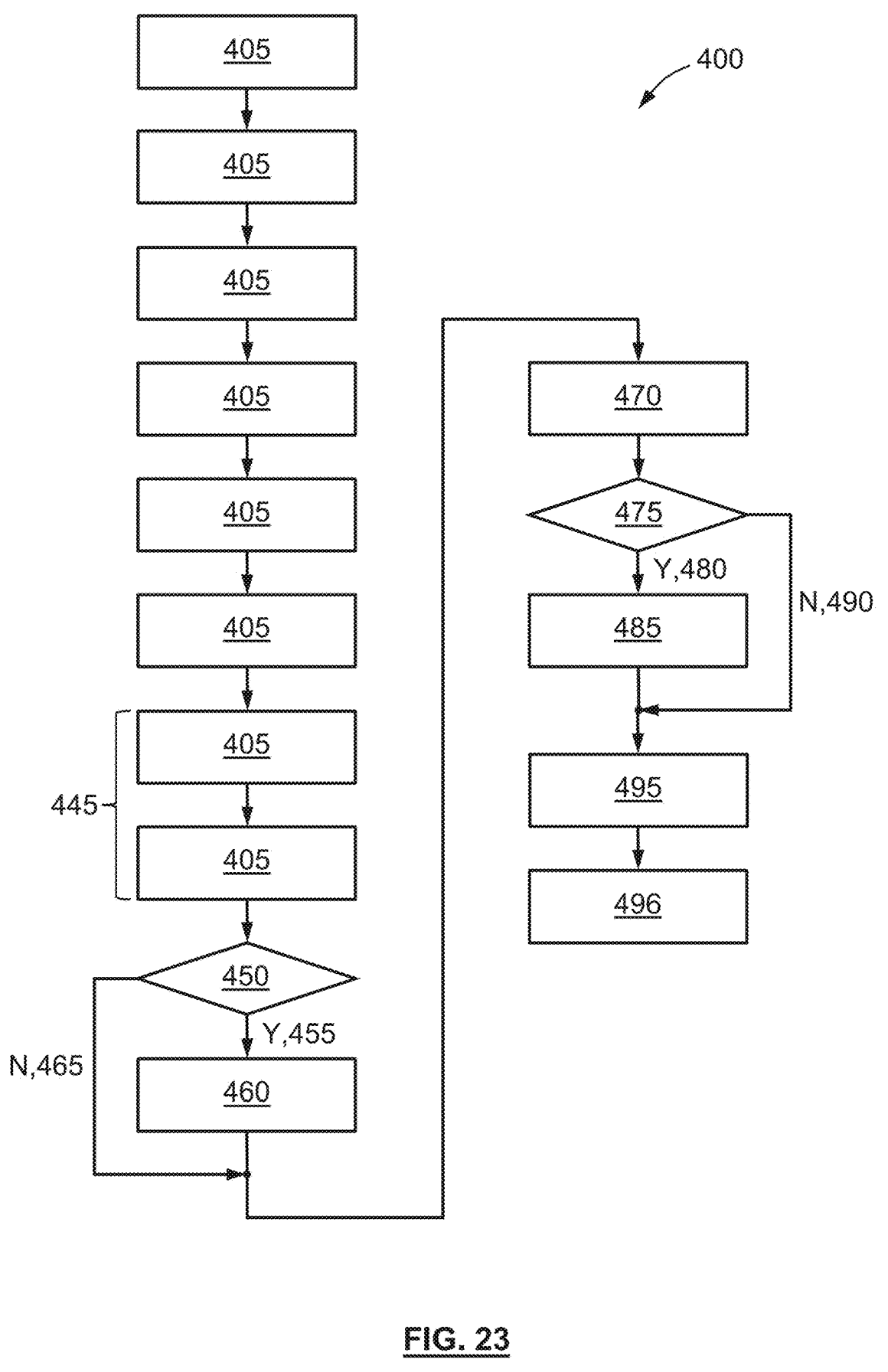

FIG. 23 shows the fourth method 400, which is a method of using an AR system 30 by a user 80 in a surrounding environment 90. The method 400 includes: at block 410, executing a user action 86 by the user 80; at block 415, sensing the user action 86 by one of the HMD, via the first group of sensors, and the HCD, via the second group of sensors; and, at block 430, modifying, by the control module, digital content displayed on the other of the HMD and the HCD based on the sensed user action 86. The method 400 may optionally also include one or more of the following: (i) at block 405, providing the AR system 30; (ii) at block 420, receiving a first command from the HMD based on the sensed user action 86, and at block 435, modifying the digital content on the HCD based on the received first command; (iii) at block 425, receiving a second command from the HCD based on the sensed user action 86, and at block 440, modifying the digital content on the HMD based on the received second command; (iv) at block 450, determining whether the modification of digital content on one of the devices 40, 50 in either of blocks 435 and 440 should be duplicated or performed on the other device 40, 50 as well, with an affirmative (e.g., "Y" or "Yes") answer causing the process flow to proceed along branch 455, and a negative (e.g., "N" or "No") answer causing the process flow to proceed along branch 465; (v) at block 445, making a first modification of the digital content on one of the HMD 40 and the HCD 50 (where the first modification may be either of the digital content modifications of blocks 435 and 440), and then, at branch 455 and block 460, simultaneously making a second modification of the digital content on the other of the HMD and the HCD (e.g., wherein the second modification is substantially the same as the first modification); (vi) at block 445 and branch 465, making a first modification of the digital content on one of the HMD 40 and the HCD 50 without modifying the digital content simultaneously on the other of the HMD and the HCD; (vii) at block 470, displaying additional digital content on the HCD 50; (viii) at block 475, determining whether the additional digital content should also be displayed on the HMD 40, with an affirmative (e.g., "Y" or "Yes") answer causing the process flow to proceed along branch 480, and a negative (e.g., "N" or "No") answer causing the process flow to proceed along branch 490; (ix) at block 470, displaying additional digital content on the HCD 50, and then, at branch 480 and block 485, simultaneously displaying the additional digital content on the HMD 40; (x) at block 470 and branch 490, displaying additional digital content on the HCD 50 without simultaneously displaying the additional digital content on the HMD 40; (xi) at block 495, utilizing one or more applications on the HCD for processing the additional digital content; and (xii) at block 496, simultaneously displaying the digital content on the HMD and on the HCD based on the sensed user action 86.

Figure 24:
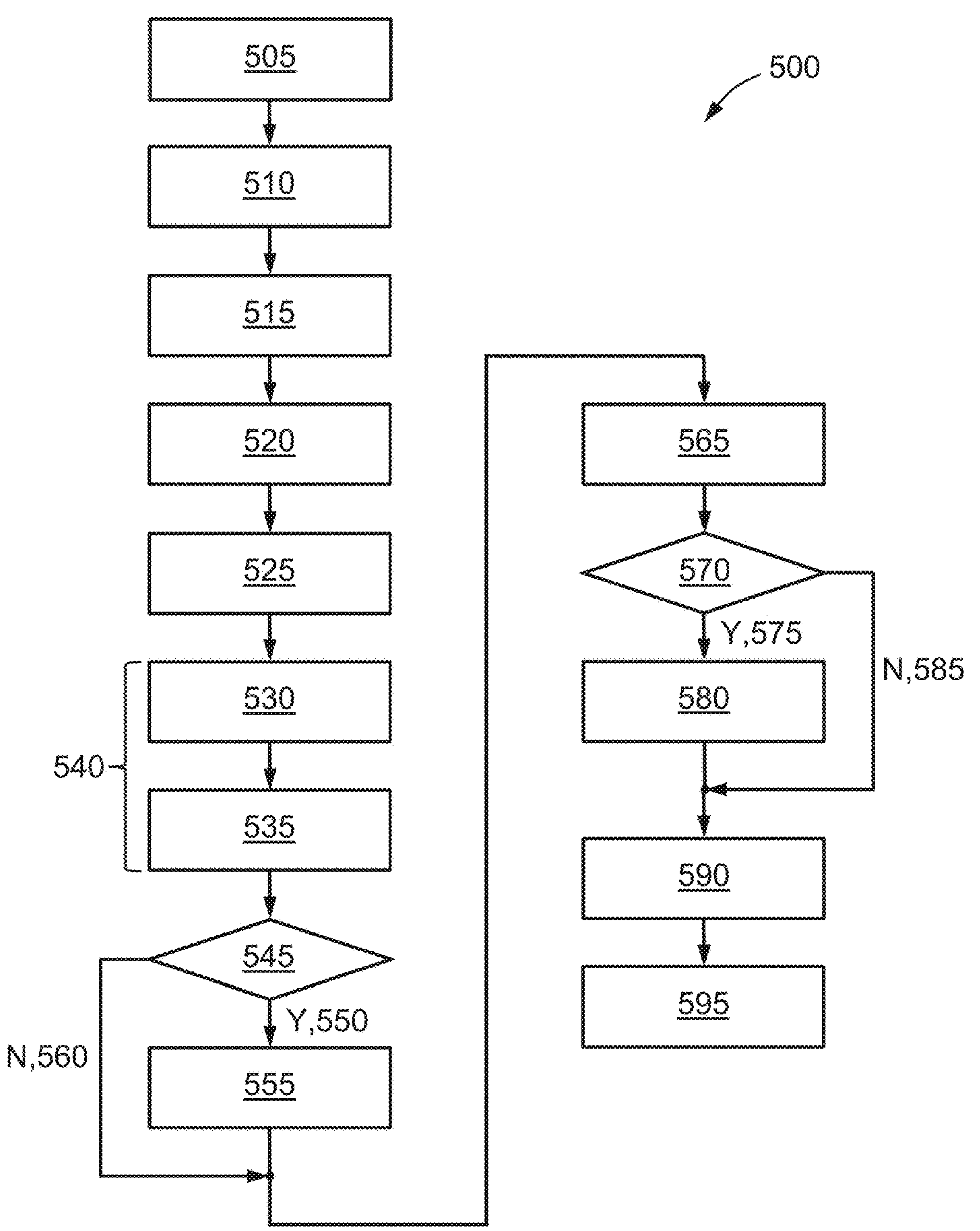

FIG. 24 shows the fifth method 500, which is a method of handling input 991 within an AR system 30. The method 200 includes: at block 510, sensing a user action 86 and/or a met condition 95 by one of the HMD, via the first group of sensors, and the HCD, via the second group of sensors; and, at block 525, causing an action to be executed on the other of the HMD and the HCD in response to the sensed user action 86 and/or the sensed met condition 95. The method 500 may optionally also include one or more of the following: (i) at block 505, providing the AR system 30; (ii) at block 515, receiving a first command from the HMD based on the sensed user action 86 and/or the sensed met condition 95, and at block 530, modifying the digital content on the HCD based on the received first command; (iii) at block 520, receiving a second command from the HCD based on the sensed user action 86 and/or the sensed met condition 95, and at block 535, modifying the digital content on the HMD based on the received second command; (iv) at block 545, determining whether the modification of digital content on one of the devices 40, 50 in either of blocks 235 and 240 should be duplicated or performed on the other device 40, 50 as well, with an affirmative (e.g., "Y" or "Yes") answer causing the process flow to proceed along branch 550, and a negative (e.g., "N" or "No") answer causing the process flow to proceed along branch 560; (v) at block 540, making a first modification of the digital content on one of the HMD 40 and the HCD 50 (where the first modification may be either of the digital content modifications of blocks 530 and 535), and then, at branch 550 and block 555, simultaneously making a second modification of the digital content on the other of the HMD and the HCD (e.g., wherein the second modification is substantially the same as the first modification); (vi) at block 540 and branch 560, making a first modification of the digital content on one of the HMD 40 and the HCD 50 without modifying the digital content simultaneously on the other of the HMD and the HCD; (vii) at block 565, displaying additional digital content on the HCD 50; (viii) at block 570, determining whether the additional digital content should also be displayed on the HMD 40, with an affirmative (e.g., "Y" or "Yes") answer causing the process flow to proceed along branch 575, and a negative (e.g., "N" or "No") answer causing the process flow to proceed along branch 585; (ix) at block 565, displaying additional digital content on the HCD 50, and then, at branch 575 and block 580, simultaneously displaying the additional digital content on the HMD 40; (x) at block 565 and branch 585, displaying additional digital content on the HCD 50 without simultaneously displaying the additional digital content on the HMD 40; (xi) at block 590, utilizing one or more applications on the HCD for processing the additional digital content; and (xii) at block 595, simultaneously displaying the digital content on the HMD and on the HCD based on the sensed user action 86 and/or the sensed met condition 95.

Figure 25:
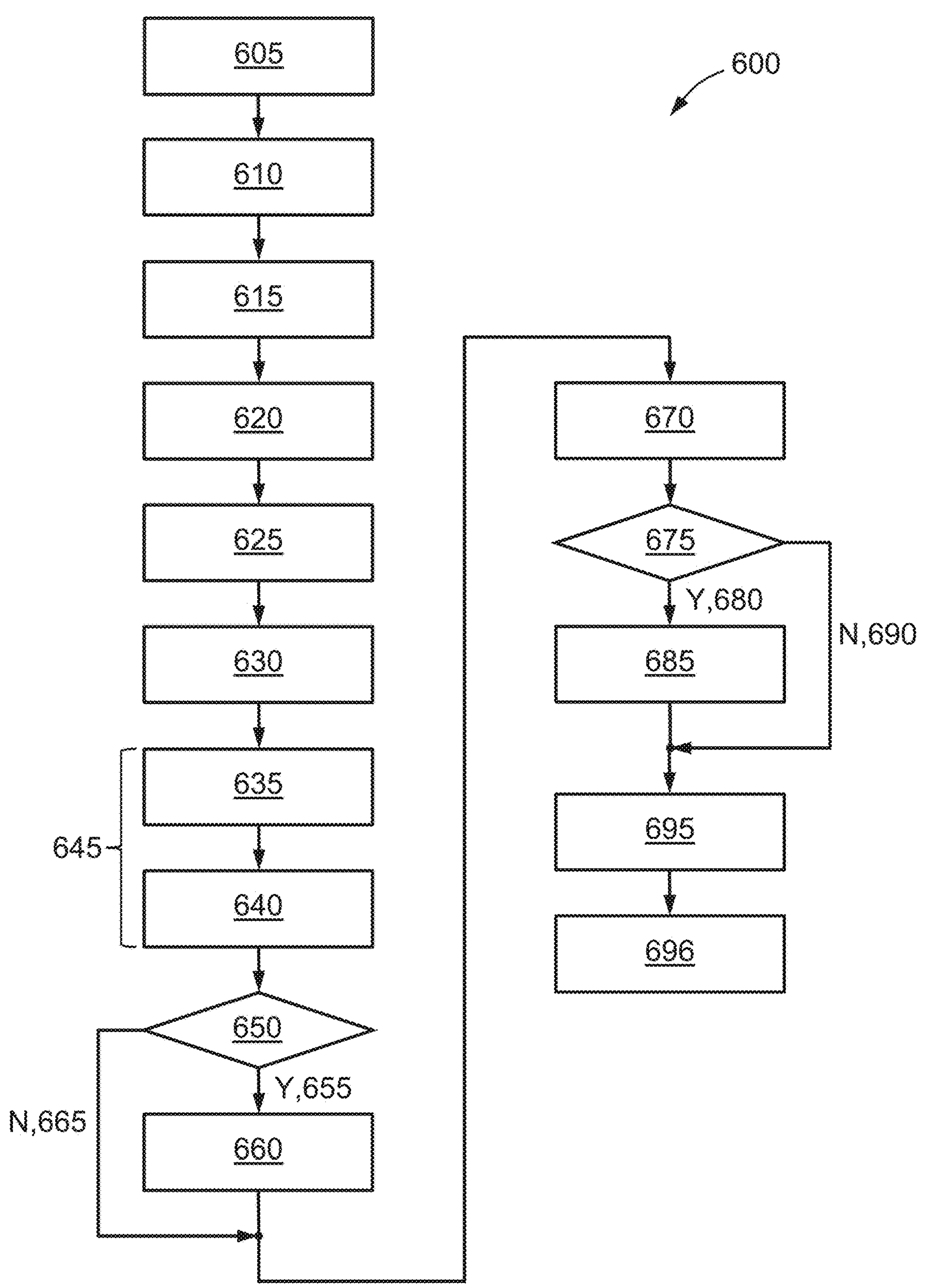

FIG. 25 shows the sixth method 600, which is a method of using an AR system 30 by a user in a surrounding environment. The method 600 includes: at block 610, executing a user action 86 by the user; at block 615, sensing the user action 86 by one of the HMD, via the first group of sensors, and the HCD, via the second group of sensors; and, at block 630, causing an action to be executed on the other of the HMD and the HCD in response to the sensed user action 86. The method 600 may optionally also include one or more of the following: (i) at block 605, providing the AR system 30; (ii) at block, 620, receiving a first command from the HMD based on the sensed user action 86, and at block 635, modifying the digital content on the HCD based on the received first command; (iii) at block 625, receiving a second command from the HCD based on the sensed user action 86, and at block 640, modifying the digital content on the HMD based on the received second command; (iv) at block 650, determining whether the modification of digital content on one of the devices 40, 50 in either of blocks 635 and 640 should be duplicated or performed on the other device 40, 50 as well, with an affirmative (e.g., "Y" or "Yes") answer causing the process flow to proceed along branch 655, and a negative (e.g., "N" or "No") answer causing the process flow to proceed along branch 665; (v) at block 645, making a first modification of the digital content on one of the HMD 40 and the HCD 50 (where the first modification may be either of the digital content modifications of blocks 635 and 640), and then, at branch 655 and block 660, simultaneously making a second modification of the digital content on the other of the HMD and the HCD (e.g., wherein the second modification is substantially the same as the first modification); (vi) at block 645 and branch 665, making a first modification of the digital content on one of the HMD 40 and the HCD 50 without modifying the digital content simultaneously on the other of the HMD and the HCD; (vii) at block 670, displaying additional digital content on the HCD 50; (viii) at block 675, determining whether the additional digital content should also be displayed on the HMD 40, with an affirmative (e.g., "Y" or "Yes") answer causing the process flow to proceed along branch 680, and a negative (e.g., "N" or "No") answer causing the process flow to proceed along branch 690; (ix) at block 670, displaying additional digital content on the HCD 50, and then, at branch 680 and block 685, simultaneously displaying the additional digital content on the HMD 40; (x) at block 670 and branch 690, displaying additional digital content on the HCD 50 without simultaneously displaying the additional digital content on the HMD 40; (xi) at block 695, utilizing one or more applications on the HCD for processing the additional digital content; and (xii) at block 696, simultaneously displaying the digital content on the HMD 40 and on the HCD based on the sensed user action 86.

Figure 26:
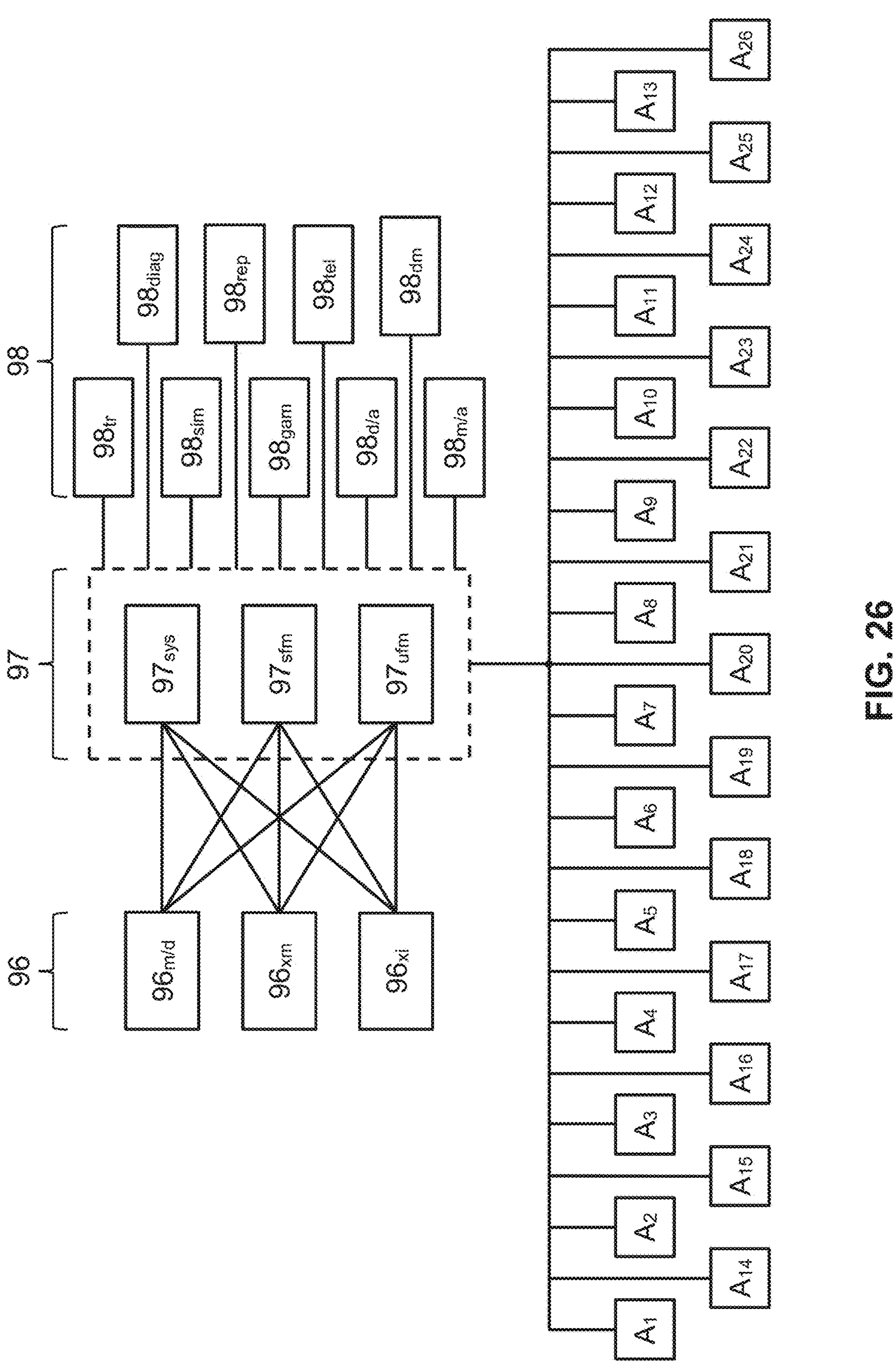
FIG. 26 is a block diagram of various actions, claim types, use cases and aspects for the AR system and method configurations.

FIG. 26 shows a block diagram of various actions 96, embodiment types 97 and applications or use cases 99 for the AR system 30 and the various method configurations 100, 200, 300, 400, 500, 600 described above. This diagram illustrates some of the combinations that are possible among the actions 96, embodiment types 97 and use cases 99 that are shown. The actions 96 may include: (i) mirroring/duplicating $\mathbf{96}_{m/d}$ the display of digital content 99 as between the HMD 40 and the HCD 50, where a user action 86 and/or met condition 95 that is sensed on one of the devices 40, 50 causes digital content 99 to be displayed (e.g., mirrored or duplicated) simultaneously on both HMD 40 and the HCD 50; (ii) cross-modifying $\mathbf{96}_{xm}$ digital content 99 as between the HMD 40 and the HCD 50, where a user action 86 and/or met condition 95 that is sensed on one of the devices 40, 50 causes a modification 89 of digital content 99 on the other device 40, 50; and (iii) cross-inputting $\mathbf{96}_{xi}$ as between the HMD 40 and the HCD 50, where a user action 86 and/or met condition 95 that is sensed on one of the devices 40, 50 causes an action $\mathbf{96}_{axi}$ to be executed on the other device 40, 50. (Here, reference number $\mathbf{96}_{axi}$ represents one or more actions that are executed by cross-inputting $\mathbf{96}_{axi}$ between the devices 40, 50. These actions $\mathbf{96}_{axi}$ may include displaying/mirroring/duplicating $\mathbf{96}_{m/d}$ digital content 99, cross-modifying $\mathbf{96}_{xm}$ digital content 99, instancing a model, triggering an animation, inputting text into one or more forms, triggering a state change, executing an application or service in response to the user action 86 and/or the met condition 95, etc.)

In FIG. 26, three different embodiment types 97 are illustrated. These include system or apparatus embodiments $\mathbf{97}_{sys}$, system-focused method embodiments $\mathbf{97}_{sfm}$ (i.e., method embodiments which feature or focus on what the AR system 30 is doing and/or how it is behaving/reacting), and user-focused method embodiments $\mathbf{97}_{ufm}$ (i.e., method embodiments which feature or focus on what the user 80 is doing and/or how it is behaving/reacting). Note that lines are shown connecting each of the actions 96 with each of the embodiment types 97, indicating that any of the actions 96 may be cast in any one or more embodiment type 97, and any embodiment type 97 may address any one or more action 96.

Additionally, any one or more of the embodiment types 97 (as represented by the dashed rectangle) may address for focus on one or more applications or use cases 98. These use cases 98 include applications such as training $\mathbf{98}_{tr}$, simulation $\mathbf{98}_{sim}$, gaming $\mathbf{98}_{gam}$, design/analysis $\mathbf{98}_{d/a}$, manufacturing/assembly $\mathbf{98}_{m/a}$, diagnosing/diagnostics $\mathbf{98}_{diag}$, repairs $\mathbf{98}_{rep}$, telecommunications $\mathbf{98}_{tel}$ and data management $\mathbf{98}_{dm}$. These use cases 98 may include activities or environments such as teaching, training, coaching, gaming, simulations, factories, software development, office environments, leisure environments, social environments, solo environments, AR, VR, and the like, whether in real-life environments or in virtual environments.

The dashed rectangle of FIG. 26 is also connected to blocks $A_1$-$A_{26}$, which represent a plurality of different aspects or features that are possible for each embodiment type 97. In the context of claim language for the present disclosure, these aspects $A_1$-$A_{26}$ may represent elements or limitations that may be found in one or more independent, dependent and/or multiple-dependent claims.

$A_1$ represents that the HCD 50 may be a smartphone, a tablet or a laptop computer.

$A_2$ represents that when wearing the HMD 40, the user has a natural field of view, the generally transparent lens has a lens field of view as viewed by the user that is within and smaller than the natural field of view, and the virtual images are projectable onto a virtual image field of view as viewed by the user that is within and smaller than the lens field of view, wherein the HCD 50 may be positioned by the user at least partially outside of the virtual image field of view.

$A_3$ represents that the user action 86 includes one or more of a roll of the HMD 40, a pitch of the HMD 40, a yaw of the HMD 40, a translation of the HMD 40, an eye movement, a hand gesture, a tool gesture, a voice command spoken to the HMD 40, a push of a button on the HCD 50, a gesture on a touchscreen or a touchpad of the HCD 50, a shaking of the HCD 50 and a voice command spoken to the HCD 50.

$A_4$ represents that the control module is further configured to permit a first modification of the digital content on one of the predetermined portion of the lens and the HCD display, and simultaneously cause a second modification of the digital content on the other of the predetermined portion of the lens and the HCD display, wherein the second modification is substantially the same as the first modification. This may sometimes be referred to herein as a "coupled" arrangement between the HMD 40 and the HCD 50, and/or between their respective displays.

$A_5$ represents that the control module is further configured to permit a first modification of the digital content on one of the predetermined portion of the lens and the HCD display without modifying the digital content simultaneously on the other of the predetermined portion of the lens and the HCD display. This may sometimes be referred to herein as a "decoupled" arrangement between the HMD 40 and the HCD 50, and/or between their respective displays.

$A_6$ represents that the AR system is configured to enable the user to add additional digital content to the HCD display with the additional digital content also being displayed simultaneously on the predetermined portion of the lens.

$A_7$ represents that the AR system is configured to enable the user to add additional digital content to the HCD display without the additional digital content being displayed simultaneously on the predetermined portion of the lens.

As represents that the AR system is configured to enable the user to add additional digital content to the HCD display and to utilize one or more applications on the HCD 50 for processing the additional digital content.

$A_9$ represents that the AR system 30 further comprises one or both of: a local ad hoc connection between the HMD 40 and the HCD 50 for facilitating communication therebetween, and a server operatively connected with the HMD 40 and the HCD 50 for facilitating communication with and/or between the HMD 40 and the HCD 50.

$A_{10}$ represents that the control module is embedded as a respective portion of one or both of the HMD 40 and the HCD 50.

$A_{11}$ represents that the control module is further configured to cause the digital content to be modified on the predetermined portion of the lens based on the user action 86 and/or the met condition 95 being sensed by the second group of sensors, and/or cause the digital content to be modified on the HCD display based on the user action 86 and/or the met condition 95 being sensed by the first group of sensors.

$A_{12}$ represents that the modification, first modification and/or second modification of the digital content includes one or more of a magnification, a minification, a rotation, a translation, an explosion into an exploded view, an assembling into an assembled view, a notation, a highlighting, a color change, a texture change, an opacity change, a status change, a characteristic change and a parameter change of the digital content or of a grouping or a respective component of the digital content.

$A_{13}$ represents that the AR system includes one or both of (i) a local ad hoc connection between the HMD 40 and the HCD 50 for facilitating communication therebetween and (ii) a server operatively connected with the HMD 40 and the HCD 50 for facilitating communication with and/or between the HMD 40 and the HCD 50, wherein the control module is embedded as a respective portion of one or more of the HMD 40, the HCD 50 and the server.

$A_{14}$ represents that the gesture on the touchscreen or the touchpad includes one or more of a tap, a double tap, a short press, a long press, a swipe, a pinch, a magnification, a pan, a drag and a rotation.

$A_{15}$ represents that a method may further include receiving a first command from the HMD 40 based on the sensed user action 86 and/or the sensed met condition 95, and modifying the digital content on the HCD 50 based on the received first command.

$A_{16}$ represents that a method may further include receiving a second command from the HCD 50 based on the sensed user action 86 and/or the sensed met condition 95, and modifying the digital content on the HMD 40 based on the received second command.

$A_{17}$ represents that a method may further include displaying additional digital content on the HCD with the additional digital content also being displayed simultaneously on the HMD 40, or displaying additional digital content on the HCD 50 without the additional digital content also being displayed simultaneously on the HMD 40.

$A_{18}$ represents that a method may further include making a first modification of the digital content on one of the HMD 40 and the HCD 50, and simultaneously making a second modification of the digital content on the other of the HMD 40 and the HCD 50, wherein the second modification is substantially the same as the first modification.

$A_{19}$ represents that a method may further include making a first modification of the digital content on one of the HMD 40 and the HCD 50 without modifying the digital content simultaneously on the other of the HMD 40 and the HCD 50

$A_{20}$ represents that a method may further include displaying additional digital content on the HCD 50, and utilizing one or more applications on the HCD 50 for processing the additional digital content.

$A_{21}$ represents that the input 991 is one or more of the user action 86, the met condition 95, a command generated in response to sensing the user action 86 and/or the met condition 95, and input generated by an application or service in response to the user action 86 and/or the met condition 95.

$A_{22}$ represents that the user action 86 represents one or more of information inputted by the user, a query inputted by the user, a selection inputted by the user, a command inputted by the user, and a response inputted by the user.

$A_{23}$ represents that the action is one or more of displaying digital content, instancing a model, triggering an animation, inputting text into one or more forms, triggering a state change, and executing an application or service in response to the user action 86 and/or the met condition 95.

$A_{24}$ represents that the action is facilitated by the control module.

$A_{25}$ represents that a method may further include providing a user prompt on one of the HMD 40 and the HCD 50.

$A_{26}$ represents that the user action 86 is made in response to the user prompt.

Note that while certain actions 96, claim types 97, use cases 98 and aspects $A_1$-$A_{26}$ have been described herein, the present disclosure is not limited to these specific instances, as the AR system 30 and methods 100, 200, 300, 400, 500, 600 may apply to other actions 96, claim types 97, use cases 98 and aspects as well. Further, note that while certain elements, limitations, features, aspects and the like may be described herein at one or more places using affirmative verb forms such as "is", "are", "includes", "has", etc., such instances may also be read and interpreted as if using permissive verb forms, such as "may be", "may include", "may have", etc. Applicant reserves the right to amend and transform any such affirmative verb form instances into corresponding permissive verb form instances.

The AR system 30 and associated methods 100, 200, 300, 400, 500, 600 may be presented or arranged in a variety of different configurations and embodiments.

According to one embodiment, an AR system 30 for use by a user 80 in a surrounding environment 90 includes: (i) an HMD 40 having a lens 42 that is generally transparent and/or permits video pass-through functionality and through which the surrounding environment 90 is visible to the user 80, a predetermined portion 43 of the lens 42 for displaying digital content 99 thereon and/or therethrough for viewing by the user 80, and a first group of sensors 47 configured for sensing a user action 86 and/or a met condition 95; (ii) an HCD 50 having an HCD display 52 and a second group of sensors 55 configured for sensing the user action 86 and/or the met condition 95; and (iii) a control module 60 operatively connected with one or both of the HMD 40 and the HCD 50, wherein the control module 60 is configured to cause the digital content 99 to be displayed simultaneously on the predetermined portion 43 of the lens 42 and on the HCD display 52.

The HCD 50 may be a smartphone $50_s$, a tablet $50_t$ or a laptop computer $50_{lc}$. When wearing the HMD 40, the user 80 may have a natural field of view 11, the generally transparent lens 42 may have a lens field of view 12 as viewed by the user 80 that is within and smaller than the natural field of view 11, and the virtual images 14 may be projectable onto a virtual image field of view 13 as viewed by the user 80 that is within and smaller than the lens field of view 12, wherein the HCD 50 may be positioned by the user 80 at least partially outside of the virtual image field of view 13.

The user action 86 may include one or more of a roll $87_r$ of the HMD 40, a pitch $87_p$ of the HMD 40, a yaw $87_y$ of the HMD 40, a translation $87_t$ of the HMD 40, an eye movement $87_{em}$, a hand gesture $87_{hg}$, a tool gesture $87_{tg}$, a voice command $87_{vc}$ spoken to the HMD 40, a push $88_p$ of a button 56 on the HCD 50, a gesture $88_g$ on a touchscreen/touchpad 57 of the HCD 50, a shaking $88_s$ of the HCD 50 and a voice command $88_{vc}$ spoken to the HCD 50. The gesture $88_g$ on the touchscreen/touchpad 57 may include one or more of a tap $88_t$, a double tap $88_{dt}$, a short press $88_{sp}$, a long press $88_{lp}$, a swipe $88_s$, a pinch $88_{pi}$, a magnification $88_m$, a pan $88_{pa}$, a drag $88_d$ and a rotation $88_r$.

The modification 89 of the digital content 99 may include one or more of a magnification $89_{ma}$, a minification $89_{mi}$, a rotation $89_r$, a translation $89_t$, an explosion $89_e$ into an exploded view $89_{ev}$, an assembling $89_a$ into an assembled view $89_{av}$, a notation $89_n$, a highlighting $89_h$, a color change $89_c$, a texture change $89_{tc}$ and an opacity change $89_{oc}$ of the digital content 99 or of a grouping $14_g$ or a respective component $14_c$ of the digital content 99.

The control module 60 may be further configured to permit a first modification of the digital content on one of the predetermined portion of the lens and the HCD display 52, and simultaneously cause a second modification of the digital content on the other of the predetermined portion of the lens and the HCD display 52, wherein the second modification is substantially the same as the first modification.

The control module 60 may be further configured to permit a first modification of the digital content on one of the predetermined portion of the lens and the HCD display 52 without modifying the digital content simultaneously on the other of the predetermined portion of the lens and the HCD display 52.

The AR system 30 may be configured to enable the user 80 to add digital content 99 to the HCD display 52 without the digital content 99 being displayed on the lens 42 of the HMD 40. Alternatively, the AR system 30 may be configured to enable the user 80 to add digital content 99 to the HCD display 52 with the digital content 99 also being displayed on the lens 42 of the HMD 40. Additionally, the AR system 30 may be configured to enable the user 80 to add digital content 99 to the HCD display 52 and to utilize one or more applications 54 on the HCD 50 for processing the digital content 99.

The AR system 30 may further include one or both of a local ad hoc connection 76 between the HMD 40 and the HCD 50 for facilitating communication therebetween, and a server 70 operatively connected with the HMD 40 and the HCD 50 for facilitating communication with and/or between the HMD 40 and the HCD 50. The control module 60 may be embedded as a respective portion 40', 50' of one or both of the HMD 40 and the HCD 50.

The control module 60 may be further configured to cause the digital content to be modified on the predetermined portion of the lens based on the user action 86 and/or the met condition 95 being sensed by the second group of sensors, and/or to cause the digital content to be modified on the HCD display 52 based on the user action 86 and/or the met condition 95 being sensed by the first group of sensors.

According to another embodiment, a method 100 of displaying digital content within an AR system is presented, wherein the AR system includes a head-mounted display (HMD) 40 having a first group of sensors configured for sensing a user action 86 and/or a met condition 95, a handheld computing device (HCD) 50 having a second group of sensors configured for sensing the user action 86 and/or the met condition 95, and a control module 60 operatively connected with one or both of the HMD 40 and the HCD 50. The method 100 includes sensing the user action 86 and/or the met condition 95, and simultaneously displaying the digital content on the HMD 40 and on the HCD 50 in response to the sensed user action 86 and/or the sensed met condition 95.

The method 100 may also include receiving a first command from the HMD 40 based on the sensed user action 86 and/or the sensed met condition 95, and modifying the digital content on the HCD 50 based on the received first command. The method 100 may further include receiving a second command from the HCD 50 based on the sensed user action 86 and/or the sensed met condition 95, and modifying the digital content on the HMD 40 based on the received second command.

The method 100 may further include displaying additional digital content on the HCD 50 with the additional digital content also being displayed simultaneously on the HMD 40, or displaying additional digital content on the HCD 50 without the additional digital content also being displayed simultaneously on the HMD 40.

The method 100 may further include making a first modification of the digital content on one of the HMD 40 and the HCD 50, and simultaneously making a second modification of the digital content on the other of the HMD 40 and the HCD 50, wherein the second modification is substantially the same as the first modification.

The method 100 may additionally include making a first modification of the digital content on one of the HMD 40 and the HCD 50 without modifying the digital content simultaneously on the other of the HMD 40 and the HCD 50.

The method 100 may further include displaying additional digital content on the HCD 50, and utilizing one or more applications on the HCD 50 for processing the additional digital content.

In this method 100, the HCD 50 may be a smartphone, a tablet or a laptop computer.

According to yet another embodiment, a method 200 of using an AR system by a user in a surrounding environment is presented, wherein the AR system includes a head-mounted display (HMD) 40 having a first group of sensors configured for sensing a user action 86, a handheld computing device (HCD) 50 having a second group of sensors configured for sensing the user action 86, and a control module 60 operatively connected with one or both of the HMD 40 and the HCD 50. The method 200 includes executing the user action 86 by the user, sensing the user action 86 by one of the HMD 40, via the first group of sensors, and the HCD 50, via the second group of sensors, and causing, by the control module 60, digital content to be displayed simultaneously on the HMD 40 and on the HCD 50 based on the sensed user action 86.

In this method 200, the user action 86 may include one or more of a roll of the HMD 40, a pitch of the HMD 40, a yaw of the HMD 40, a translation of the HMD 40, an eye movement, a hand gesture, a tool gesture, a voice command spoken to the HMD 40, a push of a button on the HCD 50, a gesture on a touchscreen or a touchpad of the HCD 50, a shaking of the HCD 50 and a voice command spoken to the HCD 50.

According to a further embodiment, an AR system 30 for use by a user in a surrounding environment includes: a head-mounted display (HMD) 40 having a lens that is generally transparent and/or permits video pass-through functionality and through which the surrounding environment is visible to the user, a predetermined portion of the lens for displaying digital content thereon and/or therethrough for viewing by the user, and a first group of sensors configured for sensing a user action 86 and/or a met condition 95; a handheld computing device (HCD) 50 having an HCD display 52 and a second group of sensors configured for sensing the user action 86 and/or the met condition 95; and a control module 60 operatively connected with one or both of the HMD 40 and the HCD 50. The control module 60 is configured to: sense the user action 86 and/or the met condition 95; and if the user action 86 and/or the met condition 95 is sensed by the first group of sensors, then modify digital content displayed on the HCD display 52 based on the sensed user action 86 and/or the sensed met condition 95; and if the user action 86 and/or the met condition 95 is sensed by the second group of sensors, then modify digital content displayed on the predetermined portion of the lens based on the sensed user action 86 and/or the sensed met condition 95.

The HCD 50 may be a smartphone $\mathbf{50}_s$, a tablet $\mathbf{50}_t$ or a laptop computer $\mathbf{50}_{lc}$. When wearing the HMD 40, the user may have a natural field of view, the generally transparent lens may have a lens field of view as viewed by the user that is within and smaller than the natural field of view, and the virtual images may be projectable onto a virtual image field of view as viewed by the user that is within and smaller than the lens field of view, wherein the HCD 50 may be positioned by the user at least partially outside of the virtual image field of view.

The user action 86 may include one or more of a roll $\mathbf{87}_r$ of the HMD 40, a pitch $\mathbf{87}_p$ of the HMD 40, a yaw $\mathbf{87}_y$ of the HMD 40, a translation $\mathbf{87}_t$ of the HMD 40, an eye movement $\mathbf{87}_{em}$, a hand gesture $\mathbf{87}_{hg}$, a tool gesture $\mathbf{87}_{tg}$, a voice command $\mathbf{87}_{vc}$ spoken to the HMD 40, a push $\mathbf{88}_p$ of a button 56 on the HCD 50, a gesture $\mathbf{88}_g$ on a touchscreen/touchpad 57 of the HCD 50, a shaking $\mathbf{88}_s$ of the HCD 50 and a voice command $\mathbf{88}_v$, spoken to the HCD 50. The gesture $\mathbf{88}_g$ on the touchscreen/touchpad 57 may include one or more of a tap $\mathbf{88}_t$, a double tap $\mathbf{88}_{dt}$, a short press $\mathbf{88}_{sp}$, a long press $\mathbf{88}_{lp}$, a swipe $\mathbf{88}_s$, a pinch $\mathbf{88}_{pi}$, a magnification $\mathbf{88}_m$, a pan $\mathbf{88}_{pa}$, a drag $\mathbf{88}_d$ and a rotation $\mathbf{88}_r$.

The control module 60 may be further configured to permit a first modification of digital content on one of the predetermined portion of the lens and the HCD display 52, and simultaneously cause a second modification of digital content on the other of the predetermined portion of the lens and the HCD display 52, wherein the second modification is substantially the same as the first modification.

The control module 60 may be further configured to permit a first modification of digital content on one of the predetermined portion of the lens and the HCD display 52 without modifying digital content simultaneously on the other of the predetermined portion of the lens and the HCD display 52.

The AR system may be configured to enable the user to add additional digital content to the HCD display 52 with the additional digital content also being displayed simultaneously on the predetermined portion of the lens. Alternatively, the AR system may be configured to enable the user to add additional digital content to the HCD display 52 without the additional digital content being displayed simultaneously on the predetermined portion of the lens. Additionally, the AR system may be configured to enable the user to add additional digital content to the HCD display 52 and to utilize one or more applications on the HCD 50 for processing the additional digital content.

The AR system may further include one or both of a local ad hoc connection between the HMD 40 and the HCD 50 for facilitating communication therebetween, and a server operatively connected with the HMD 40 and the HCD 50 for facilitating communication with and/or between the HMD 40 and the HCD 50.

The control module 60 may be embedded as a respective portion of one or both of the HMD 40 and the HCD 50.

The control module 60 may be further configured to cause the digital content to be displayed simultaneously on the predetermined portion of the lens and on the HCD display 52.

According to yet a further embodiment, a method 300 of modifying digital content within an AR system that includes a head-mounted display (HMD) 40 having a first group of sensors configured for sensing a user action 86 and/or a met condition 95, a handheld computing device (HCD) 50 having a second group of sensors configured for sensing the user action 86 and/or the met condition 95, and a control module 60 operatively connected with one or both of the HMD 40 and the HCD 50, the method 300 comprising: sensing the user action 86 and/or the met condition 95; and if the user action 86 and/or the met condition 95 is sensed by the first group of sensors, then modifying digital content displayed on the HCD 50 based on the sensed user action 86 and/or the sensed met condition 95; and if the user action 86 and/or the met condition 95 is sensed by the second group of sensors, then modifying digital content displayed on the HMD 40 based on the sensed user action 86 and/or the sensed met condition 95.

The method 300 may also include receiving a first command from the HMD 40 based on the sensed user action 86 and/or the sensed met condition 95, and modifying the digital content on the HCD 50 based on the received first command.

The method 300 may further include receiving a second command from the HCD 50 based on the sensed user action 86 and/or the sensed met condition 95, and modifying the digital content on the HMD 40 based on the received second command.

The method 300 may further include displaying additional digital content on the HCD 50 with the additional digital content also being displayed simultaneously on the HMD 40, or displaying additional digital content on the HCD 50 without the additional digital content also being displayed simultaneously on the HMD 40.

The method 300 may further include making a first modification of the digital content on one of the HMD 40 and the HCD 50, and simultaneously making a second modification of the digital content on the other of the HMD 40 and the HCD 50, wherein the second modification is substantially the same as the first modification.

The method 300 may further include making a first modification of the digital content on one of the HMD 40 and the HCD 50 without modifying the digital content simultaneously on the other of the HMD 40 and the HCD 50.

The method 300 may further include displaying additional digital content on the HCD 50, and utilizing one or more applications on the HCD 50 for processing the additional digital content.

The method 300 may further include simultaneously displaying the digital content on the HMD 40 and on the HCD 50 based on the sensed user action 86 and/or the sensed met condition 95.

According to an additional embodiment, a method 400 of using an AR system by a user in a surrounding environment, wherein the AR system includes a head-mounted display (HMD) 40 having a first group of sensors configured for sensing a user action 86, a handheld computing device (HCD) 50 having a second group of sensors configured for sensing the user action 86, and a control module 60 operatively connected with one or both of the HMD 40 and the HCD 50, the method 400 comprising: executing the user action 86 by the user; sensing the user action 86 by one of the HMD 40, via the first group of sensors, and the HCD 50, via the second group of sensors; and modifying, by the control module 60, digital content displayed on the other of the HMD 40 and the HCD 50 based on the sensed user action 86.

In this method 400, the user action 86 may include one or more of a roll of the HMD 40, a pitch of the HMD 40, a yaw of the HMD 40, a translation of the HMD 40, an eye movement, a hand gesture, a tool gesture, a voice command spoken to the HMD 40, a push of a button on the HCD 50, a gesture on a touchscreen or a touchpad of the HCD 50, a shaking of the HCD 50 and a voice command spoken to the HCD 50.

According to another further embodiment, an AR system 30 for use by a user in a surrounding environment includes: (i) a head-mounted display (HMD) 40 having a lens that is generally transparent and/or permits video pass-through functionality and through which the surrounding environment is visible to the user, a predetermined portion of the lens for displaying digital content thereon and/or therethrough for viewing by the user, and a first group of sensors configured for sensing a user action 86 and/or a met condition 95; (ii) a handheld computing device (HCD) 50 having an HCD display 52 and a second group of sensors configured for receiving the user action 86 and/or the met condition 95; and (iii) a control module 60 operatively connected with one or both of the HMD 40 and the HCD 50. The control module 60 is configured to: sense the user action 86 and/or the met condition 95 by one of the HMD 40, via the first group of sensors, and the HCD 50, via the second group of sensors; and cause an action to be executed on the other of the HMD 40 and the HCD 50 in response to the sensed user action 86 and/or the sensed met condition 95.

The HCD 50 may be a smartphone $50_s$, a tablet $50_t$ or a laptop computer $50_{lc}$. When wearing the HMD 40, the user may have a natural field of view, the generally transparent lens may have a lens field of view as viewed by the user that is within and smaller than the natural field of view, and the virtual images may be projectable onto a virtual image field of view as viewed by the user that is within and smaller than the lens field of view, wherein the HCD 50 may be positioned by the user at least partially outside of the virtual image field of view.

The user action 86 may include one or more of a roll $87_r$ of the HMD 40, a pitch $87_p$ of the HMD 40, a yaw $87_y$ of the HMD 40, a translation $87_t$ of the HMD 40, an eye movement $87_{em}$, a hand gesture $87_{hg}$, a tool gesture $87_{tg}$, a voice command $87_{vc}$ spoken to the HMD 40, a push $88_p$ of a button 56 on the HCD 50, a gesture $88_g$ on a touchscreen/touchpad 57 of the HCD 50, a shaking $88_s$ of the HCD 50 and a voice command $88_{vc}$ spoken to the HCD 50. The gesture $88_g$ on the touchscreen/touchpad 57 may include one or more of a tap $88_t$, a double tap $88_{dt}$, a short press $88_{sp}$, a long press $88_{lp}$, a swipe $88_s$, a pinch $88_{pi}$, a magnification $88_m$, a pan $88_{pa}$, a drag $88_d$ and a rotation $88_r$.

The control module 60 may be further configured to permit a first modification of digital content on one of the predetermined portion of the lens and the HCD display 52, and simultaneously cause a second modification of digital content on the other of the predetermined portion of the lens and the HCD display 52, wherein the second modification is substantially the same as the first modification.

The control module 60 may be further configured to permit a first modification of digital content on one of the predetermined portion of the lens and the HCD display 52 without modifying digital content simultaneously on the other of the predetermined portion of the lens and the HCD display 52.

The AR system may be configured to enable the user to add additional digital content to the HCD display 52 with the additional digital content also being displayed simultaneously on the predetermined portion of the lens. Alternatively, the AR system may be configured to enable the user to add additional digital content to the HCD display 52 without the additional digital content being displayed simultaneously on the predetermined portion of the lens. Additionally, the AR system may be configured to enable the user to add additional digital content to the HCD display 52 and to utilize one or more applications on the HCD 50 for processing the additional digital content.

The AR system may further include one or both of a local ad hoc connection between the HMD 40 and the HCD 50 for facilitating communication therebetween, and a server operatively connected with the HMD 40 and the HCD 50 for facilitating communication with and/or between the HMD 40 and the HCD 50.

The control module 60 may be embedded as a respective portion of one or both of the HMD 40 and the HCD 50.

The control module 60 may be further configured to cause other digital content to be displayed simultaneously on the predetermined portion of the lens and on the HCD display 52.

According to yet another further embodiment, a method 500 of handling input within an AR system, wherein the AR system includes a head-mounted display (HMD) 40 having a first group of sensors configured for sensing a user action 86 and/or a met condition 95, a handheld computing device (HCD) 50 having a second group of sensors configured for sensing the user action 86 and/or the met condition 95, and a control module 60 operatively connected with one or both of the HMD 40 and the HCD 50, the method 500 comprising: sensing the user action 86 and/or the met condition 95 by one of the HMD 40, via the first group of sensors, and the HCD 50, via the second group of sensors; and causing an action to be executed on the other of the HMD 40 and the HCD 50 in response to the sensed user action 86 and/or the sensed met condition 95.

The method 500 may also include receiving a first command from the HMD 40 based on the sensed user action 86 and/or the sensed met condition 95, and modifying digital content on the HCD 50 based on the received first command.

The method 500 may further include receiving a second command from the HCD 50 based on the sensed user action 86 and/or the sensed met condition 95, and modifying digital content on the HMD 40 based on the received second command.

The method 500 may further include displaying additional digital content on the HCD 50 with the additional digital content also being displayed simultaneously on the HMD 40, or displaying additional digital content on the HCD 50 without the additional digital content also being displayed simultaneously on the HMD 40.

The method 500 may further include making a first modification of digital content on one of the HMD 40 and the HCD 50, and simultaneously making a second modification of digital content on the other of the HMD 40 and the HCD 50, wherein the second modification is substantially the same as the first modification.

The method 500 may further include making a first modification of digital content on one of the HMD 40 and the HCD 50 without modifying digital content simultaneously on the other of the HMD 40 and the HCD 50.

The method 500 may further include displaying additional digital content on the HCD 50, and utilizing one or more applications on the HCD 50 for processing the additional digital content.

In the method 500, the control module 60 may be configured to cause other digital content to be displayed simultaneously on the HMD 40 and on the HCD 50 based on the sensed user action 86 and/or the sensed met condition 95.

The input may be one or more of the user action 86, the met condition 95, a command generated in response to sensing the user action 86 and/or the met condition 95, and input generated by an application or service in response to the user action 86 and/or the met condition 95.

The user action 86 may represent one or more of information inputted by the user, a query inputted by the user, a selection inputted by the user, a command inputted by the user, and a response inputted by the user.

The action may be one or more of displaying digital content, instancing a model, triggering an animation, inputting text into one or more forms, triggering a state change, and executing an application or service in response to the user action 86 and/or the met condition 95. The action may be facilitated by the control module 60.

The method 500 may further include providing a user prompt on one of the HMD 40 and the HCD 50. The user action 86 may be made in response to the user prompt.

According to still another embodiment, a method 600 of using an AR system by a user in a surrounding environment, wherein the AR system includes a head-mounted display (HMD) 40 having a first group of sensors configured for sensing a user action 86, a handheld computing device (HCD) 50 having a second group of sensors configured for sensing the user action 86, and a control module 60 operatively connected with one or both of the HMD 40 and the HCD 50, the method 600 comprising: executing the user action 86 by the user; sensing the user action 86 by one of the HMD 40, via the first group of sensors, and the HCD 50, via the second group of sensors; and causing, by the control module 60, an action to be executed on the other of the HMD 40 and the HCD 50 in response to the sensed user action 86.

In this method 600, the user action 86 may include one or more of a roll of the HMD, a pitch of the HMD 40, a yaw of the HMD 40, a translation of the HMD 40, an eye movement, a hand gesture, a tool gesture, a voice command spoken to the HMD 40, a push of a button on the HCD 50, a gesture on a touchscreen or a touchpad of the HCD 50, a shaking of the HCD 50 and a voice command spoken to the HCD 50.

While various steps of the methods 100, 200, 300, 400, 500, 600 have been described as being separate blocks, and various functions of the system 30 have been described as being separate modules or elements, it may be noted that two or more steps may be combined into fewer blocks, and two or more functions may be combined into fewer modules or elements. Similarly, some steps described as a single block may be separated into two or more blocks, and some functions described as a single module or element may be separated into two or more modules or elements. Additionally, the order of the steps or blocks described herein may be rearranged in one or more different orders, and the arrangement of the functions, modules and elements may be rearranged into one or more different arrangements. Further, elements, limitations and features from one or more embodiments or configurations herein may be added to any other embodiments or configurations herein, so as to produce one or more independent, dependent and/or multiple-dependent claims, such as suggested by (but not limited to) the relationships shown in FIG. 26.

(As used herein, a "module" may include hardware and/or software, including executable instructions, for receiving one or more inputs, processing the one or more inputs, and providing one or more corresponding outputs. Also note that at some points throughout the present disclosure, reference may be made to a singular input, output, element, etc., while at other points reference may be made to plural/multiple inputs, outputs, elements, etc. Thus, weight should not be given to whether the input(s), output(s), element(s), etc. are used in the singular or plural form at any particular point in the present disclosure, as the singular and plural uses of such words should be viewed as being interchangeable, unless the specific context dictates otherwise.)

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51 to 99% out of a possible extent of 100%", and do not necessarily mean "perfectly", "completely", "strictly", "entirely" or "100%". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. An augmented reality (AR) system for use by a user in a surrounding environment, comprising:

a head-mounted display (HMD) having a lens that is generally transparent or permits video pass-through functionality and through which the surrounding environment is visible to the user, a predetermined portion of the lens for displaying digital content thereon or therethrough for viewing by the user, and a first group of sensors configured for sensing a met condition;

a handheld computing device (HCD) having an HCD display and a second group of sensors configured for sensing the met condition; and one or more processors operatively connected with one or more of the HMD or the HCD, wherein the one or more processors are configured to:

sense the met condition;

cause digital content to be displayed simultaneously on the predetermined portion of the lens and on the HCD display based on the sensed met condition;

when the met condition is sensed by the first group of sensors, modify the digital content displayed on the HCD display; and when the met condition is sensed by the second group of sensors, modify the digital content displayed on the predetermined portion of the lens.

2. The AR system of claim 1, wherein when wearing the HMD, the user has a natural field of view, the lens has a lens field of view as viewed by the user that is within and smaller than the natural field of view, and virtual images are projectable onto a virtual image field of view as viewed by the user that is within and smaller than the lens field of view, wherein the HCD may be positioned by the user at least partially outside of the virtual image field of view.

3. The AR system of claim 1, wherein, to sense the met condition, the one or more processors are configured to sense a user action, and wherein the user action includes one or more of:

a roll of the HMD,
a pitch of the HMD,
a yaw of the HMD,
a translation of the HMD,
an eye movement,
a hand gesture,
a tool gesture,
a voice command spoken to the HMD,
a push of a button on the HCD,
a gesture on a touchscreen/touchpad of the HCD,
a shaking of the HCD, or
a voice command spoken to the HCD.

4. The AR system of claim 1, wherein the one or more processors are further configured to:

permit a first modification of digital content on one of the predetermined portion of the lens or the HCD display, and simultaneously cause a second modification of digital content on the other of the predetermined portion of the lens or the HCD display, wherein the second modification is substantially the same as the first modification.

5. The AR system of claim 1, wherein the one or more processors are further configured to permit a first modification of digital content on one of the predetermined portion of the lens or the HCD display without modifying digital content simultaneously on the other of the predetermined portion of the lens or the HCD display.

6. The AR system of claim 1, wherein the AR system is configured to enable the user to add additional digital content to the HCD display with the additional digital content also being displayed simultaneously on the predetermined portion of the lens.

7. The AR system of claim 1, wherein the AR system is configured to enable the user to add additional digital content to the HCD display without the additional digital content being displayed simultaneously on the predetermined portion of the lens.

8. The AR system of claim 1, wherein the AR system is configured to enable the user to add additional digital content to the HCD display and to utilize one or more applications on the HCD for processing the additional digital content.

9. The AR system of claim 1, further comprising:

one or more of;

a local ad hoc connection between the HMD and the HCD for facilitating communication therebetween; or a server operatively connected with the HMD and the HCD for facilitating communication with or between the HMD and the HCD.

10. The AR system of claim 1, wherein the one or more processors comprise:

a first processor embedded as a portion of the HMD, a second processor embedded as a portion of the HCD, or both the first processor and the second processor.

11. A method of modifying digital content within an AR system that includes a head-mounted display (HMD) having a first group of sensors configured for sensing a met condition, a handheld computing device (HCD) having a second group of sensors configured for sensing the met condition, and one or more processors operatively connected with one or more of the HMD or the HCD, the method comprising:

sensing the met condition;

causing digital content to be displayed simultaneously on the HMD and on the HCD based on the sensed met condition;

when the met condition is sensed by the first group of sensors, modifying the digital content displayed on the HCD; and when the met condition is sensed by the second group of sensors, modifying the digital content displayed on the HMD.

12. The method of claim 11, further comprising:

receiving a first command from the HMD based on the sensed met condition; and modifying the digital content displayed on the HCD based on the received first command.

13. The method of claim 11, further comprising:

receiving a second command from the HCD based on the sensed met condition; and modifying the digital content displayed on the HMD based on the received second command.

14. The method of claim 11, further comprising:

displaying additional digital content on the HCD with the additional digital content also being displayed simultaneously on the HMD; or displaying additional digital content on the HCD without the additional digital content also being displayed simultaneously on the HMD.

15. The method of claim 11, further comprising:

making a first modification of the digital content on one of the HMD and the HCD; and simultaneously making a second modification of the digital content on the other of the HMD and the HCD, wherein the second modification is substantially the same as the first modification.

16. The method of claim 11, further comprising:

making a first modification of the digital content on one of the HMD and the HCD without modifying the digital content simultaneously on the other of the HMD and the HCD.

17. The method of claim 11, further comprising:

displaying additional digital content on the HCD; and utilizing one or more applications on the HCD for processing the additional digital content.

18. The method of claim 11, wherein the one or more processors comprise:

a first processor embedded as a portion of the HMD, a second processor embedded as a portion of the HCD, or both the first processor and the second processor.

19. A method of using an augmented reality (AR) system by a user in a surrounding environment, wherein the AR system includes a head-mounted display (HMD) having a first group of sensors configured for sensing a user action, a handheld computing device (HCD) having a second group of sensors configured for sensing the user action, and one or more processors operatively connected with one or more of the HMD or the HCD, the method comprising:

executing the user action by the user;

sensing the user action by:

the HMD, via the first group of sensors, or the HCD, via the second group of sensors;

causing digital content to be displayed simultaneously on the HMD and on the HCD based on the sensed user action;

when the user action is sensed by the first group of sensors, modifying, by the one or more processors, the digital content displayed on the HCD; and when the user action is sensed by the second group of sensors, modifying, by the one or more processors, the digital content displayed on the HMD.

20. The method of claim 19, wherein the one or more processors comprise:

a first processor embedded as a portion of the HMD, a second processor embedded as a portion of the HCD, or both the first processor and the second processor.

* * * * *